(12) United States Patent
Natsuno et al.

(10) Patent No.: US 7,447,772 B2
(45) Date of Patent: Nov. 4, 2008

(54) AUTHENTICATION SYSTEM, AUTHENTICATION UNDERTAKING APPARATUS, AND TERMINAL APPARATUS

(75) Inventors: Takeshi Natsuno, Tokyo (JP); Ryuji Kuwana, Kanazawa (JP)

(73) Assignee: NTT DoCoMo, Inc., Tokyo (JP)

( * ) Notice: Subject to any disclaimer, the term of this patent is extended or adjusted under 35 U.S.C. 154(b) by 618 days.

(21) Appl. No.: 10/181,139

(22) PCT Filed: Nov. 8, 2001

(86) PCT No.: PCT/JP01/09780

§ 371 (c)(1),
(2), (4) Date: Jul. 9, 2002

(87) PCT Pub. No.: WO02/39294

PCT Pub. Date: May 16, 2002

(65) Prior Publication Data

US 2003/0018918 A1     Jan. 23, 2003

(30) Foreign Application Priority Data

Nov. 10, 2000    (JP)    ............................. 2000-344402

(51) Int. Cl.
    G06F 15/173    (2006.01)
(52) U.S. Cl. ...................................... 709/225; 709/227
(58) Field of Classification Search .................. 709/225, 709/227
    See application file for complete search history.

(56) References Cited

U.S. PATENT DOCUMENTS

| 5,671,354 | A | | 9/1997 | Ito et al. |
| 5,684,950 | A | | 11/1997 | Dare et al. |
| 5,850,445 | A | * | 12/1998 | Chan et al. .................. 380/247 |
| 6,131,120 | A | * | 10/2000 | Reid ........................... 709/225 |
| 6,615,264 | B1 | * | 9/2003 | Stoltz et al. .................. 709/227 |
| 6,618,806 | B1 | * | 9/2003 | Brown et al. ................ 713/186 |

FOREIGN PATENT DOCUMENTS

| CN | 1191027 A | 8/1998 |
| EP | 0 573 248 A1 | 12/1993 |
| EP | 0 986 209 A2 | 3/2000 |
| EP | 0 991 242 A2 | 4/2000 |
| EP | 1 011 285 A1 | 6/2000 |
| JP | 7-129269 | 5/1995 |

(Continued)

OTHER PUBLICATIONS

Card Wave, "A Passport for Virtual World," vol. 13, No. 10, Sep. 10, 2000, pp. 92-95. (Translation Included).

(Continued)

Primary Examiner—Asghar Bilgrami
(74) Attorney, Agent, or Firm—Brinks Hofer Gilson & Lione

(57) ABSTRACT

An authentication processing system includes a communication network, a plurality of terminal apparatuses, and an authentication undertaking apparatus. The authentication undertaking apparatus authenticates the user of each terminal apparatus through utilization of data which include at least either data fixedly assigned to the terminal apparatus or data peculiar to the user, specifies a site which the user wishes to utilize, and undertakes authentication processing with reference to a database which stores authentication data which become necessary when the authenticated user utilizes the desired site.

32 Claims, 15 Drawing Sheets

FOREIGN PATENT DOCUMENTS

| | | |
|---|---|---|
| JP | 10177552 | 6/1998 |
| JP | 11-134298 | 5/1999 |
| JP | H11-224236 | 8/1999 |
| JP | 2000-148685 | 5/2000 |
| JP | 2000-184448 | 6/2000 |
| JP | 2000-259566 | 9/2000 |
| KR | 2000-0017937 | 4/2000 |
| WO | WO 96/36934 | 11/1996 |
| WO | WO 01/82190 A1 | 11/2001 |

OTHER PUBLICATIONS

*Network Computing*, "Feature: 'Cellular phone' will change the corporate system Enterprise e-mobile now in motion," vol. 12, No. 8, Aug. 1, 2000, pp. 22-31. (Translation Included).

"Logon Assist for Multiple Logons", *IBM Technical Disclosure Bulletin, IBM Corp.*, New York, vol. 32, No. 8A, Jan. 1990, pp. 303-305.

Labuschagne, L. et al., "Improved System-access Control Using Complementary Technologies", *Computers & Security*, Elsevier Science Publishers, Amsterdam, NL vol. 16, No. 6, 1997 pp. 543-549.

Canadian Application No. 2,394,215 Canadian Office Action dated Jan. 16, 2007.

Office Action for Patent Application No. 2002-541549 dated Nov. 21, 2006, (including translation).

Sahara Michiko, "IC Card Research Club in an Urban Cottage YOU 141/Virtual World Passport—Biometrics Authentication Technology Will Change the Networking Society Tomorrow." Sep. 12, 2000 (including partial translation).

* cited by examiner

| MEMBER NUMBER | NAME | PHONE NUMBER | GENERAL AUTHENTICATION DATA | | AUTHENTICATION LEVEL | VALID TERM | CONNECTION DESTINATION ID | INDIVIDUAL AUTHENTICATION DATA | | INSURANCE PREMIUM | USAGE FEE |
|---|---|---|---|---|---|---|---|---|---|---|---|
| | | | VOICEPRINT DATA | FINGERPRINT DATA | | | | ID | PASSWORD | | |
| 1 | C | ⋮ | ⋮ | ⋮ | 2 | ⋮ | 7 | docom | ******* | 0 | 100 |
| | | | | | | | 5 | omocod | — | | |
| 2 | B | ⋮ | ⋮ | — | 1 | ⋮ | 5 | 65883 | — | 100 | 100 |
| 3 | A | ⋮ | ⋮ | — | 1 | ⋮ | ⋮ | ⋮ | ⋮ | 100 | 100 |

| CONNECTION DESTINATION ID | TITLE | CONNECTION DATA | CLASSIFICATION | ID NECESSARY/ UNNECESSARY | PASSWORD NECESSARY/ UNNECESSARY | ID ATTRIBUTE | PASSWORD ATTRIBUTE |
|---|---|---|---|---|---|---|---|
| 1 | | ... | ... | ... | ... | ... | ... |
| 2 | | ... | ... | ... | ... | ... | ... |
| 3 | | ... | ... | ... | ... | ... | ... |
| 4 | | ... | ... | ... | ... | ... | ... |
| 5 | PRIZE CONTEST LIST | http://www.d.net/list/list.cgi | PRIZE CONTEST | NECESSARY | UNNECESSARY | 4-8 | ... |
| 6 | | ... | ... | ... | ... | ... | ... |
| 7 | COMPANY D POINT | https://www.c.co.jp/point/point.cgi | SHOPPING | NECESSARY | NECESSARY | 4-8 | 8-16 |
| 8 | | ... | ... | ... | ... | ... | ... |

| AUTHENTICATION LEVEL | COLLATION DATA | INSURANCE PREMIUM |
|---|---|---|
| 1 | VOICE SIGNAL | 100 |
| 2 | FINGERPRINT IMAGE | 50 |
| 3 | FINGERPRINT IMAGE AND VOICE SIGNAL | 0 |

AUTHENTICATION SYSTEM, AUTHENTICATION UNDERTAKING APPARATUS, AND TERMINAL APPARATUS

TECHNICAL FIELD

The present invention relates to an authentication system which provides authentication data necessary for authentication of a member to a site which provides services to the member via a communication network, to thereby eliminate the necessity of manual input of authentication data which the member would otherwise have to input for accessing the site by use of a terminal apparatus. The present invention further relates to an authentication undertaking apparatus and a terminal apparatus which constitute the authentication system.

BACKGROUND ART

Widespread use of the Internet has led to creation of a membership Internet site which provides a service to limited members over the Internet and creation of a site which provides a different service on a user-by-user basis over the Internet (hereinafter, these sites will be referred to as "members-only sites" or simply as "sites"). The operators of these sites issue to each registered member or registered user (hereinafter referred to as a member) a unique ID (identification data) and a password (hereinafter, ID and password will be collectively referred to as individual authentication data).

When a certain member accesses a site from a terminal apparatus in order to use a service provided by the site, the site transmits to the terminal apparatus of the member a form for inputting individual authentication data and requests the member to input the individual authentication data. In response to the input request, the member manually inputs the individual authentication data by operating the terminal apparatus. The site receives the individual authentication data, and when the received individual authentication data are correct, authenticates that the service usage request from the terminal apparatus is a usage request from a member or the like. Thereafter, the user of the authenticated terminal apparatus can use a desired service provided by the site.

A user of a terminal apparatus which utilizes a plurality of such members-only sites must memorize a plurality of individual authentication data sets corresponding to respective services in order to utilize the services. When the individual authentication data sets to be used for a plurality of services are unified to common authentication data, the problem that the user must memorize a plurality of individual authentication data sets may be solved.

However, in actuality, individual authentication data do not have a unified format and/or an attribute and therefore differ among sites. For example, individual authentication data of a certain site may consist of an ID composed of 4 to 8 numeric characters only and a password composed of 8 to 12 alphabetic characters only; and individual authentication data of another site may consist of an ID only, which is composed of 9 to 10 alphanumeric characters. In many sites, members cannot select individual authentication data freely. Further, unification of individual authentication data among a plurality of sites is not desirable from the viewpoint of security. Accordingly, consolidating individual authentication data sets through unification thereof has been difficult.

Even when individual authentication data sets can be unified to a common set, the user's inconvenience of having to manually input individual authentication data when utilizing a members-only site has not been solved. For example, even in the case in which the user of a terminal apparatus has utilized a service of a certain members-only site upon input of certain individual authentication data and the user subsequently utilizes a service of another members-only site which accepts the same individual authentication data, the user must input the individual authentication data again.

Some methods are highly convenient for a user, because the methods eliminate necessity of inputting individual authentication data.

A first example method utilizes a terminal apparatus configured in such a manner that when the terminal apparatus receives a form for inputting individual authentication data, the terminal apparatus automatically inputs the individual authentication data into the corresponding input field. This method can eliminate the labor of the user required to input individual authentication data into the terminal apparatus.

However, in this case, since the individual authentication data is stored in the terminal apparatus, there is a possibility that a third party obtains the stored individual authentication data and uses it fraudulently. Further, this method is not preferable from the viewpoint of security.

A second example method utilizes a so-called global ID service.

This service provides means which enables a user to store, at the site which provides this service, a plurality of individual authentication data sets for a plurality of members-only sites to be used. When a user of this service logs in to the site by inputting an ID and a password over the Internet, the site provides, to an individual members-only site which the user wishes to utilize, individual authentication data that satisfy the requirements from the members-only site. In other words, users of this service are relieved of the necessity to manually input individual authentication data for each members-only site.

However, when the ID and password necessary for logging in to the global ID service are leaked, all the individual authentication data sets stored in the site are leaked simultaneously. That is, use of the global ID service increases the risk of leaking individual authentication data as compared with the case in which each user manages a plurality of individual authentication data sets.

DISCLOSURE OF THE INVENTION

The present invention provides an authentication processing system comprising a communication network; a plurality of terminal apparatuses, each being connectable to the communication network via communication means and connectable to a plurality of sites via the communication network; and an authentication undertaking apparatus connected to the communication network. The authentication undertaking apparatus comprises a first database for storing, for each user of the terminal apparatuses, a plurality of individual authentication data sets to be putted into the sites; authentication means for authenticating the user of each terminal apparatus through utilization of at least either data fixedly assigned to the terminal apparatus or data peculiar to the user; specification means for specifying a site which the user authenticated by the authentication means wishes to utilize; and undertaking means for extracting, with reference to the first database, individual authentication data corresponding to the user authenticated by the authentication means and the site specified by the specification means and for providing the extracted individual authentication data to the specified site.

Preferably, the authentication processing system of the present invention authenticates the user of each terminal apparatus through utilization of data peculiar to a human body. More preferably, the terminal apparatus includes means for performing a first-half stage of authentication processing for the obtained data peculiar to the human body.

Preferably, the authentication processing system of the present invention includes authentication level selection means for enabling the user to select an authentication level. More preferably, the authentication processing system of the present invention includes insurance-premium charge means for determining an insurance premium on the basis of the selected authentication level.

Preferably, the authentication processing system of the present invention includes authentication valid-term management means for managing a valid term during which the authentication is valid.

Preferably, the authentication processing system of the present invention includes update means for enabling the plurality of sites to update the first database.

The present invention provides an authentication undertaking apparatus which comprises a first database for storing, for each user of the terminal apparatuses, a plurality of individual authentication data sets to be putted into the sites; authentication means for authenticating the user of each terminal apparatus through utilization of at least either data fixedly assigned to the terminal apparatus or data peculiar to the user; specification means for specifying a site which the user authenticated by the authentication means wishes to utilize; and undertaking means for extracting, with reference to the first database, individual authentication data corresponding to the user authenticated by the authentication means and the site specified by the specifications means and for providing the extracted individual authentication data to the specified site.

Preferably, the authentication undertaking apparatus of the present invention authenticates the user of each terminal apparatus through utilization of data peculiar to a human body.

The present invention provides a terminal apparatus comprising communication means connectable to a communication network; connection means connectable to a site and an authentication undertaking apparatus via the communication network; means for obtaining data peculiar to a human body; and means for performing a first-half stage of authentication processing for the obtained data peculiar to the human body.

BRIEF DESCRIPTION OF THE DRAWINGS

FIG. 3 is a conceptual diagram showing the configuration of an individual table T1 provided in an authentication database VDB.

FIG. 4 is a conceptual diagram showing the configuration of a site table T2 provided in a site database SDB.

BEST MODE FOR CARRYING OUT THE INVENTION

The present invention will next be described in detail with reference to the attached drawings.

A. First Embodiment

<A-1. Configuration>

<A-1-1. General Description>

Figure 1:
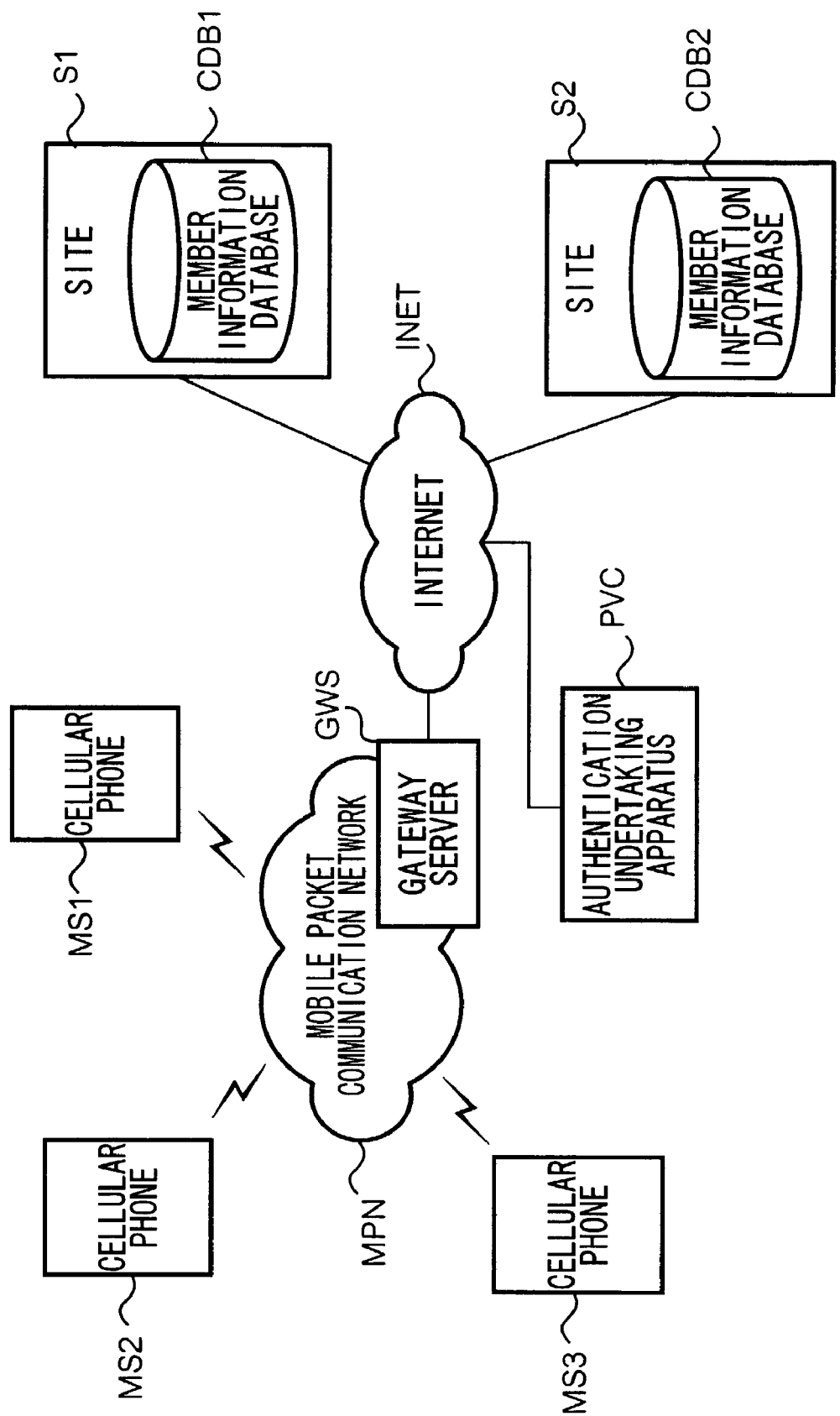
FIG. 1 is a block diagram showing the configuration of an authentication system used in first and second embodiments of the present invention.

FIG. 1 is a block diagram showing the configuration of an authentication system according to a first embodiment of the present invention. As shown in FIG. 1, the authentication system according of the present embodiment includes an authentication undertaking apparatus PVC, a plurality of cellular phones MS (MS1 to MS3), a plurality of members-only service provision sites S (S1, S2), a mobile communication network MPN, the Internet INET, and a gateway server GWS.

The number of the cellular phones MS accommodated within the authentication system according to the present embodiment is arbitrary, and therefore is not limited to that shown in FIG. 1. The number of the sites S accommodated within the authentication system according to the present embodiment is arbitrary, and therefore is not limited to that shown in FIG. 1.

The authentication undertaking apparatus PVC is connected to the Internet INET. The authentication undertaking apparatus PVC provides a service (hereinafter referred to as authentication undertaking processing) which is performed on behalf of a user of a cellular phone MS, which processing the user performs when the user starts utilization of a members-only service provision site S (S1, S2). The authentication service is a members-only service. The authentication undertaking apparatus PVC provides a member number to each member of the service and requests the member to register general authentication data.

Each of the cellular phones MS (MS1 to MS3) can establish connection with the mobile communication network MPN by means of radio communication.

The members-only service provision sites S (S1, S2) are connected to the Internet. The sites S (S1, S2) provide members-only services to users of the Internet. The sites S (S1, S2) each have a member information database CDB (CDB1, CDB2) which stores individual authentication data to be used for authenticating members who utilize the service. Each of the sites S provides the service only to the members registered in the member information database. The individual authentication data include a member number (member ID) and authentication data (password).

The site S1 in the present embodiment provides the members-only service to members who can utilize communication means which employs the SSL (Secure Sockets Layer) encryption protocol (hereinafter referred to as SSL communication).

The mobile communication network MPN includes a plurality of base stations, a plurality of switch stations, a plurality of interconnecting gateway switch stations, a plurality of subscriber processing apparatuses, a gateway server GWS, and wireless and wired communication lines connecting them. The mobile communication network MPN has a function of relaying data between the cellular phones MS and the Internet INET and a function of charging the users fees for use of the mobile communication network MPN.

The gateway server GWS mutually connects the mobile communication network MPN with other networks, including the Internet INET, through conversion of communication protocols different among the networks. The gateway server GWS is preferably disposed at an interconnecting gateway switch station of the mobile communication network. Upon receipt of a GET request of HTTP (HyperText Transfer Protocol) (hereinafter referred to as a GET request) from a cellular phone MS, the gateway server GWS analyzes an URI (Uniform Resource Identifier) contained in the GET request. When the URI designates a site on the Internet INET, the gateway server GWS transfers the GET request to the Internet INET. The gateway server GWS receives a response to the GET request transmitted from the Internet INET and transmits the response to the cellular phone MS.

When the URI represents a resource of the gateway server GWS, the gateway server GWS transmits to the cellular phone MS a resource corresponding to the GET request. Resources held by the gateway server GWS include UI definition data which are described in HTML (HyperText Markup Language) and define a user interface of the cellular phone MS.

However, when the cellular phone MS carries out HTTP communication with a certain site on the Internet while using the SSL encryption protocol (designated by https://), the gateway server GWS does not participate in the communication between the cellular phone MS and the site.

<A-1-2. Authentication Undertaking Apparatus>

Figure 2:
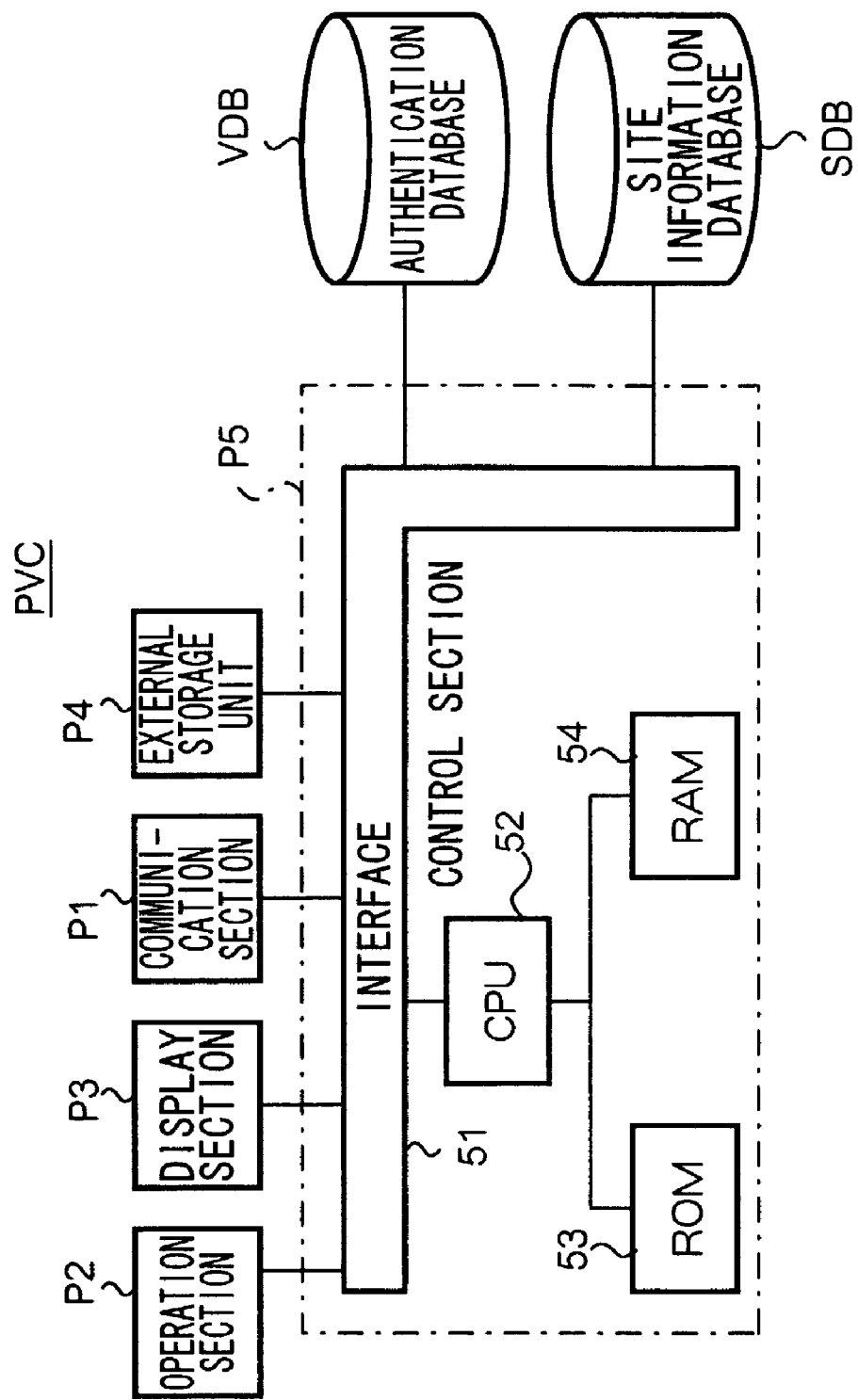
FIG. 2 is a block diagram showing the configuration of an authentication undertaking apparatus PVC used in the first and second embodiments.

FIG. 2 is a block diagram showing the configuration of the authentication undertaking apparatus PVC according to the present embodiment. As shown in FIG. 2, the authentication undertaking apparatus PVC according to the present embodiment includes an authentication database VDB, a site information database SDB, a communication section P1, an operation section P2, a display section P3, a storage unit P4, and a control section P5.

The authentication database VDB includes an individual table T1. FIG. 3 is a conceptual view showing the configuration of the individual table T1. The individual table T1 will be described with reference to FIG. 3.

The individual table T1 contains a record for each member of the authentication service. The record has a member number field for storing a unique member number; a name field for storing the appellation (name) of the member; a phone number field for storing the phone number of a cellular phone MS which the member uses; a general authentication data field for storing, in an encrypted form, data (hereinafter referred to as general authentication reference data) based on which authentication of the member (hereinafter referred to as general authentication) is performed; an authentication level field; a valid term field for storing a valid term of general authentication; connection destination ID fields for storing IDs of connection destinations (sites) for which the authentication service must be performed; individual authentication data fields for storing, in an encrypted form, individual authentication data sets to be putted into the connection destinations; an insurance premium field for storing an insurance premium for coverage against illegal use by a third party; and a usage-fee field for storing a usage fee for the authentication service.

The plurality of connection destination ID fields and the plurality of individual authentication data fields contained in the individual table T1 correspond to a plurality of connection destinations which the member utilizes. The general authentication data field is divided into a voiceprint data field and a fingerprint data field. The individual authentication data fields are each divided into an ID field and a password field.

At the time of membership registration, data are stored in the respective fields for member number, appellation (name), phone number of the cellular phone MS, general authentication reference data of the member, insurance premium, and usage fee, among the above-described fields.

The site information database SDB includes a site table T2.

FIG. 4 is a conceptual view showing the configuration of the site table T2. The site table T2 will be described with reference to FIG. 4.

The site table T2 includes a record for each connection destination ID. The record has a connection destination ID field; a title field for storing the title of a connection destination; a connection data field for storing data, including a URI, required for establishing a connection; a classification field for storing a classification of a provided service; an ID necessary/unnecessary field for storing data representing whether an ID is to be input before usage of the service; a password necessary/unnecessary field for storing data representing whether a password is to be input before usage of the service; an ID attribute field for storing the attribute (e.g., the number of bytes) of an ID when the ID is to be input; and a password attribute field for storing the attribute (e.g., the number of bytes) of a password when the password is to be input. The ID attribute and password attribute each represent requirements regarding data format, including the number and types of characters which can be used in individual authentication data which each members-only service requires at the time of authentication. Further, the individual table T1 of FIG. 3 and the site table T2 of FIG. 4 are related to each other, with the connection destination IDs used as keys.

The communication section P1 can communicate with other nodes via the internet INET.

The operation section P2 includes a keyboard and a pointing device. The operation section P2 may further include an arbitrary device used for inputting operation instructions and data.

The display section P3 includes a display. The display section P3 may further include an arbitrary display unit.

The external storage unit P4 includes an electronic disk unit and a hard disk drive. The external storage unit P4 may further include an arbitrary external storage unit.

The control section P5 includes a CPU (Central Processing Unit) 52, an interface 51, ROM (Read Only Memory) 53, and RAM (Random Access Memory) 54.

The interface 51 connects the CPU 52 and the respective sections VDB, SDB, and P1 to P4.

The CPU 52 controls the respective sections VDB, SDB, and P1 to P4 via the interface 51 and causes the authentication undertaking apparatus PVC to perform various types of processing, including start processing (<A-2>), communication processing (<A-3>), membership registration processing (<A4-3>), menu registration processing (<A-5-3>), authentication undertaking processing (<A-6-3> and <A-6-B>), insurance-charging processing (<A-7>), and site registration processing (<A-8>), which will be described later.

The ROM 53 stores software which the CPU 52 executes in order to perform the above-described various types of processing, various types of data to which the CPU 52 refers, and other software and data.

The RAM 54 is used as a work memory of the CPU 52. The authentication undertaking apparatus PVC of the present embodiment may include any number of CPUs. The authentication undertaking apparatus PVC of the present embodiment may be controlled in a centralized manner by use of an apparatus including a single CPU, as shown in FIG. 2, or in a distributed manner by use of an apparatus including a plurality of CPUs.

<A-1-3. Cellular Phone MS>

Figure 5:
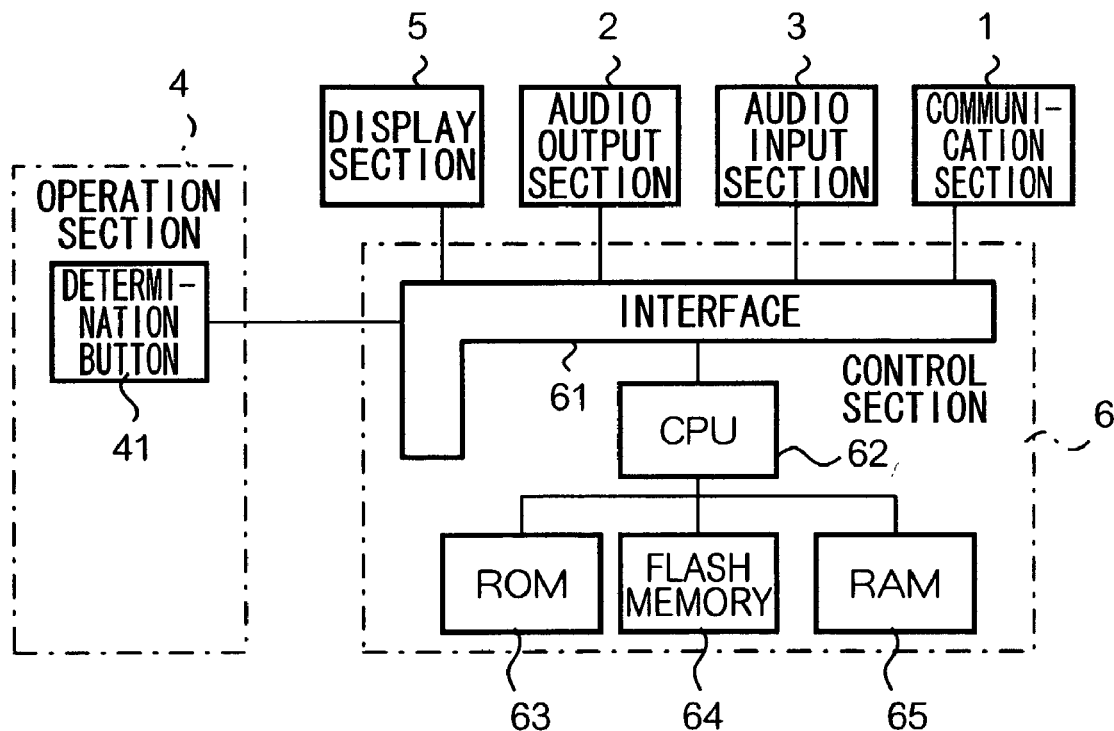
FIG. 5 is a block diagram of a cellular phone MS used in the first and second embodiments.

FIG. 5 is a block diagram showing an example configuration of the cellular phone MS according to the present embodiment. As shown in FIG. 5, the cellular phone MS includes a communication section 1, an audio output section 2, an audio input section 3, an operation section 4, a display section 5, and a control section 6.

The communication section 1 includes an antenna, a transmitter, and a receiver for performing radio communications. The communication section 1 can communicate with the mobile communication network by means of radio. The audio output section 2 includes a sound source, a speaker, and a unit for generating sound.

The audio input section 3 includes a microphone for inputting voice.

The operation section 4 includes a keypad (not shown) for inputting instruction and data, buttons (not shown) for various selections, and a determination button 41.

The display section 5 includes a liquid crystal display for display operation.

The control section 6 includes an interface 61, a CPU 62, ROM 63, flash memory 64, and RAM 65.

The interface 61 connects the CPU 62 and the respective sections 1 to 5.

The CPU 62 controls the respective sections 1 to 5 via the interface 61 and causes the cellular phone MS to perform various types of processing, including start processing (<A-2>), communication processing (<A-3>), membership registration request processing (<A-4-2>), menu registration request processing (<A-5-2>), and authentication undertaking request processing (<A-6-2>), which will be described later.

The ROM 63 stores software which the CPU 62 executes in order to perform the above-described various types of processing, various types of data to which the CPU 62 refers, and other software and data. In particular, the ROM 63 stores browser software for enabling a user of the cellular phone MS to utilize WWW (World Wide Web) services on the Internet, and a URI for designating a resource of the gateway server GWS in which UI data are stored, as a URI (hereinafter referred to as home URI) which the browser accesses first.

The browser used in the present embodiment is configured in such a manner that when the browser receives HTML data including an input tag for inputting general authentication data, the browser can identify the input tag. Further, the browser can display a screen which prompts a user of the cellular phone to input general authentication data designated by the input tag and, when the user inputs general authentication data, transmits the input general authentication data to the source of the HTML data. In the present embodiment, the processing designated by the input tag for general authentication data includes "Obtainment of Voice" and "Obtainment of Voice Signal and Fingerprint Image."

The flash memory (nonvolatile memory) 64 stores data transferred from the CPU 62.

The RAM 65 is used as a work memory of the CPU 62.

(Determination Button 41)

Figure 6:
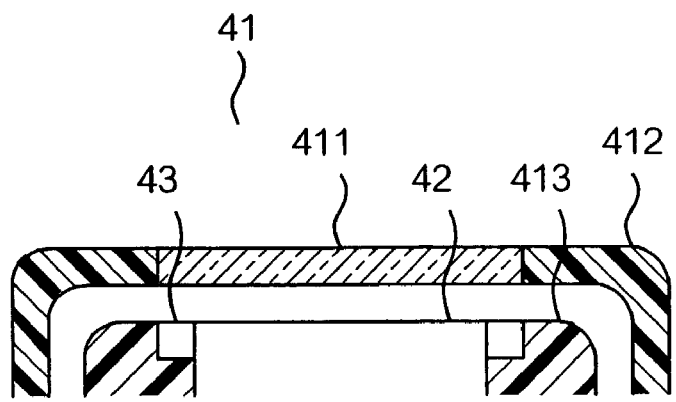
FIG. 6 is a schematic view of a determination button 41 provided on the cellular phone MS.

FIG. 6 is a schematic view showing the internal structure of the determination button 41 provided at the operation section 4 of the cellular phone MS 1 according to the present embodiment.

As shown in FIG. 6, the determination button 41 includes a transparent plate 411, a support member 412 for supporting the transparent plate 411, a support member 413 fixedly assigned to the casing of the cellular phone, a camera 42 attached to the support member 413, and a light source 43. An internal gap is defined by means of the transparent plate 411, the support member 412, the support member 413, the camera 42, and the light source 43.

When the transparent plate 411 and the support member 412 are depressed from above in FIG. 6 by means of a finger of the user, they move downward in FIG. 6. When the pressing force is released, the transparent plate 411 and the support member 412 return to their original positions. The transparent plate 411 may be formed of a transparent or semi-transparent material such as glass or acryl.

The camera 42 is disposed so as to photograph, via the transparent plate 411, the front surface (fingerprint) of the finger which presses the transparent plate 411. A CCD (Charge-Coupled Device) camera may be used for the camera 42.

The light source 43 is disposed in an annular shape to surround the camera 42 in order to uniformly illuminate the finger of the user which presses the transparent plate 411. An LED (Light-Emitting Diode) may be used for the light source 43.

<A-2. Start Processing>

Upon power on, the CPU 52 of the authentication undertaking apparatus PVC executes the software stored in the ROM 53 in order to cause the authentication undertaking apparatus PVC to start accepting SSL communication, membership registration processing, menu registration processing, authentication undertaking processing, and site registration processing. Further, the CPU 52 causes the authentication undertaking apparatus PVC to start insurance-charging processing.

Upon power on, the CPU 62 of the cellular phone MS executes the software stored in the ROM 63 and then monitors an instruction input from the operation section 4. Upon detection of an instruction that indicates start of usage of a WWW service, the CPU 62 executes the browser stored in the ROM 63. The CPU 62 connects the cellular phone MS to the mobile communication network by controlling the radio communication section.

The browser transmits a GET request to the gateway server GWS in order to obtain the UI data which are stored in the gateway server and are designated by the home URI stored in the ROM 62.

Figure 7:
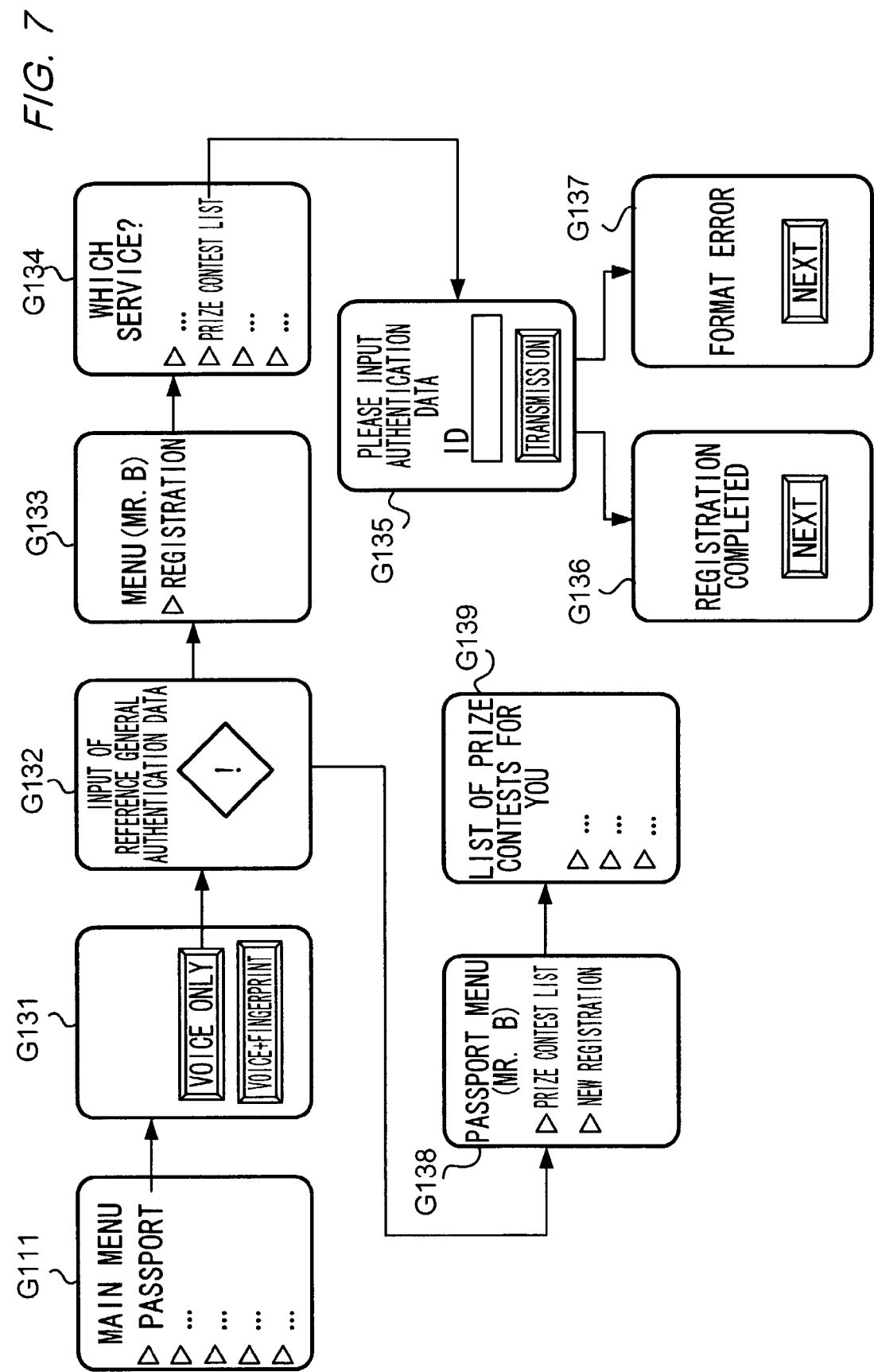
FIG. 7 is a diagram showing an example screen displayed on the cellular phone MS2.

Upon receipt of the UI data, the CPU 62 provides a user interface to the user of the cellular phone MS on the basis of the UI data and then ends the start processing. At this time, a main menu (e.g., a screen G111 shown in FIG. 7) is displayed on the display section 5 of the cellular phone MS.

<A-3. Communication Processing>

The browser operating on the cellular phone MS transmits an SSL communication request to the authentication undertaking apparatus PVC.

Upon receipt of the SSL communication request, the authentication undertaking apparatus PVC starts to handshake with the cellular phone MS in accordance with an SSL handshake protocol.

Upon establishment of a new cession between the authentication undertaking apparatus PVC and the cellular phone MS, the authentication undertaking apparatus PVC starts SSL communication. When the session is not established, the authentication undertaking apparatus PVC ends the communication processing without performance of SSL communication. Use of SSL communication reduces the risk of transmitted and received data (in particular, data including voice and fingerprint image) being used fraudulently by a third party.

The cellular phone MS performs SSL communication with the site S1. The authentication undertaking apparatus PVC can perform SSL communication with the site S1.

<A-4. Membership Registration Processing>

<A-4-1. General Description>

Figure 8:
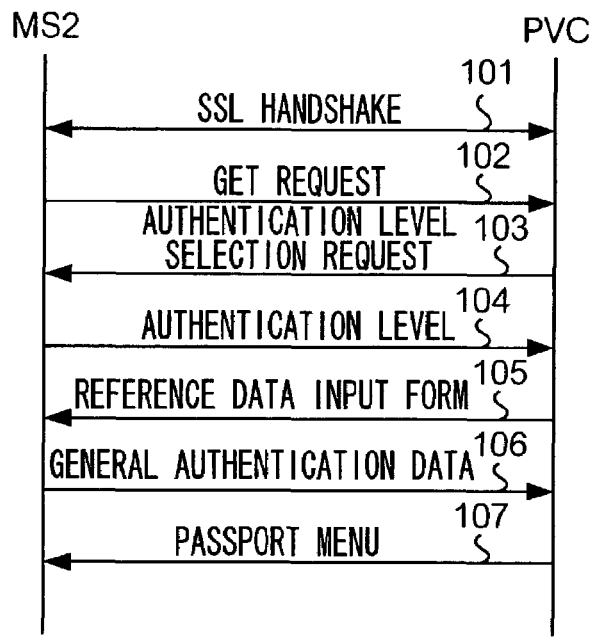
FIG. 8 is a diagram showing the flow of data at the time a user of the cellular phone MS2 of the first embodiment performs membership registration.

FIG. 8 is a diagram showing the flow of data at the time a person who wishes to utilize the authentication service of the present embodiment registers himself or herself as a member of the authentication service of the present embodiment from a cellular phone MS2 owned by the person. Here, we assume that the user, the phone number of the cellular phone MS2, and the appellation ("B" in this example) of the user of the cellular phone MS2 are not stored in the individual table T1.

(Step 101): SSL communication starts between the cellular phone MS2 and the authentication undertaking apparatus PVC.

(Step 102): Upon start of the SSL communication, the cellular phone MS2 transmits to the authentication undertaking apparatus PVC a GET request signal that contains the phone number of the cellular phone MS2.

(Step 103): Upon receipt of the GET request signal, the authentication undertaking apparatus PVC judges whether the user of the cellular phone MS2 is a member of the authentication service.

When the user of the cellular phone MS2 is judged not to be a member of the authentication service, the authentication undertaking apparatus PVC transmits to the cellular phone MS2 a signal that includes an authentication level selection request.

When the user of the cellular phone MS2 is judged to be a member of the authentication service, the authentication undertaking apparatus PVC proceeds to authentication undertaking processing, which will be described later.

(Step 104): Upon receipt of the signal that includes an authentication level selection request, the cellular phone MS2 displays a screen for requesting the user to select an authentication level.

Upon completion of selection of an authentication level by the user, the cellular phone MS2 transmits to the authentication undertaking apparatus PVC data representing the selected authentication level.

(Step 105): The authentication undertaking apparatus PVC transmits to the cellular phone MS2 a signal that includes a reference data input form.

(Step 106): Upon receipt of the data that includes the reference data input form, the cellular phone MS2 prompts the user of the cellular phone MS2 to input general authentication data.

Upon completion of input of general authentication data by the user, the cellular phone MS2 transmits the input general authentication data to the authentication undertaking apparatus PVC.

(Step 107): The authentication undertaking apparatus PVC registers the received general authentication data and completes the membership registration processing.

In the present embodiment, general authorization can be omitted immediately after completion of membership registration. Therefore, the authentication undertaking apparatus PVC transmits to the cellular phone MS2 a passport menu signal which enables the user to select an item for which the authentication service must be performed. The passport menu signal will be described later.

<A-4-2. Operation of Terminal Apparatus for Membership Registration Request Processing>

(Step 101): When the user selects "Passport" from the main menu (screen G111 of FIG. 7), the cellular phone MS2 starts SSL communication with the authentication undertaking apparatus PVC.

(Step 102): The cellular phone MS2 transmits to the authentication undertaking apparatus PVC a GET request signal that contains data representing the phone number of the cellular phone MS2.

(Step 103): Upon receipt of the signal that includes an authentication level selection request, the cellular phone MS2 displays on the display section 5 a screen for prompting the user to select an authentication level (e.g., screen G131 of FIG. 7), on the basis of the authentication level selection request.

(Step 104): When the user selects "Voice Only," the cellular phone MS2 transmits to the authentication undertaking apparatus PVC an authentication level corresponding to "Voice Only" (in the present embodiment, the authentication level is set to "1" for the case of "Voice Only" and to "3" for the case of "Fingerprint Data and Voiceprint Data").

(Step 105): Upon receipt of the reference data input form, the cellular phone MS2 interprets a tag for general authentication data input contained in the reference data input form. Since the previously selected authentication level is "1," which indicates "Voice Only," the cellular phone MS2 detects from the input form a tag for voice input, interprets the tab, and displays on the display section 5 a screen for prompting the user to input voice (e.g., screen G132 of FIG. 7) (steps SA1 and SA2 of FIG. 9).

(Step 106): Upon detection of depression of the determination switch 41 by the user, the cellular phone MS2 transmits to the authentication undertaking apparatus PVC the voice which is input from the sound input section 3 at the time of depression and serves as general authentication data and then completes the membership registration request processing.

<A-4-3. Operation of Authentication Undertaking Apparatus for Membership Registration Processing>

(Step 101): SSL communication between the authentication undertaking apparatus PVC and the cellular phone MS2 starts.

(Step 102): The authentication undertaking apparatus PVC receives via the communication section P1 a GET request transmitted from a non-member.

(Step 103): The authentication undertaking apparatus PVC searches the individual table T1 while using the phone number of the cellular phone MS2 contained in the received GET request as a key.

When the authentication undertaking apparatus PVC detects that a record containing the phone number has not been registered in the individual table T1, the authentication undertaking apparatus PVC adds a record to the individual table T1.

The authentication undertaking apparatus PVC generates a new member number, stores it in the member number field of the added record, and stores a usage fee "100" in the usage-fee field of the record.

The authentication undertaking apparatus PVC transmits to the cellular phone MS2 the signal that includes an authentication level selection request.

(Step 104): The authentication undertaking apparatus PVC stores in the authentication level field of the record the received authentication level "1," which represents "Voice Only."

(Step 105): In accordance with the authentication level "1," which represents "Voice Only," the authentication undertaking apparatus PVC transmits to the cellular phone MS2 a signal which includes a reference data input form that includes a tag for inputting voice as general authentication data and a tag for inputting the appellation of the user.

The authentication undertaking apparatus PVC stores into the insurance premium field of the record a value "100" corresponding to the authentication level "1," which represents "Voice Only" ("50" when the authentication level is "2", and "0" when the authentication level is "3").

(Step 106): The authentication undertaking apparatus PVC receives voice as general authentication data.

The authentication undertaking apparatus PVC generates voiceprint data from the received voice and stores the voiceprint data in the voiceprint data field of the record after encrypting the data.

Also, upon receipt of data containing the appellation of the user, the authentication undertaking apparatus PVC registers the received appellation in the name field of the record.

Further, the authentication undertaking apparatus PVC obtains the present time and stores in the valid term field of the record a time which is later than the present time by a certain interval.

The system may be modified to enable the user to set the valid term. For example, this can be realized through employment of a reference data input form which includes an additional tag for inputting a valid term.

Further, this can be realized though addition of a shift time field to the individual table T1, employment of a reference data input form which includes an additional tag for inputting a shift time, and an operation of determining a valid term on the basis of the shift time representing a valid time.

(Step 107): After completion of the processing of Step 106, the authentication undertaking apparatus PVC ends the membership registration processing.

The authentication undertaking apparatus PVC transmits to the cellular phone MS2 a signal that includes a passport menu signal, after which the membership registration processing ends. In the present embodiment, general authorization can be omitted immediately after completion of membership registration. Therefore, the authentication undertaking apparatus PVC transmits to the cellular phone MS2 a passport menu signal which enables the user to select an item for which the authentication service must be performed.

<A-5. Menu Registration Processing>

<A-5-1. General Description>

Figure 10:
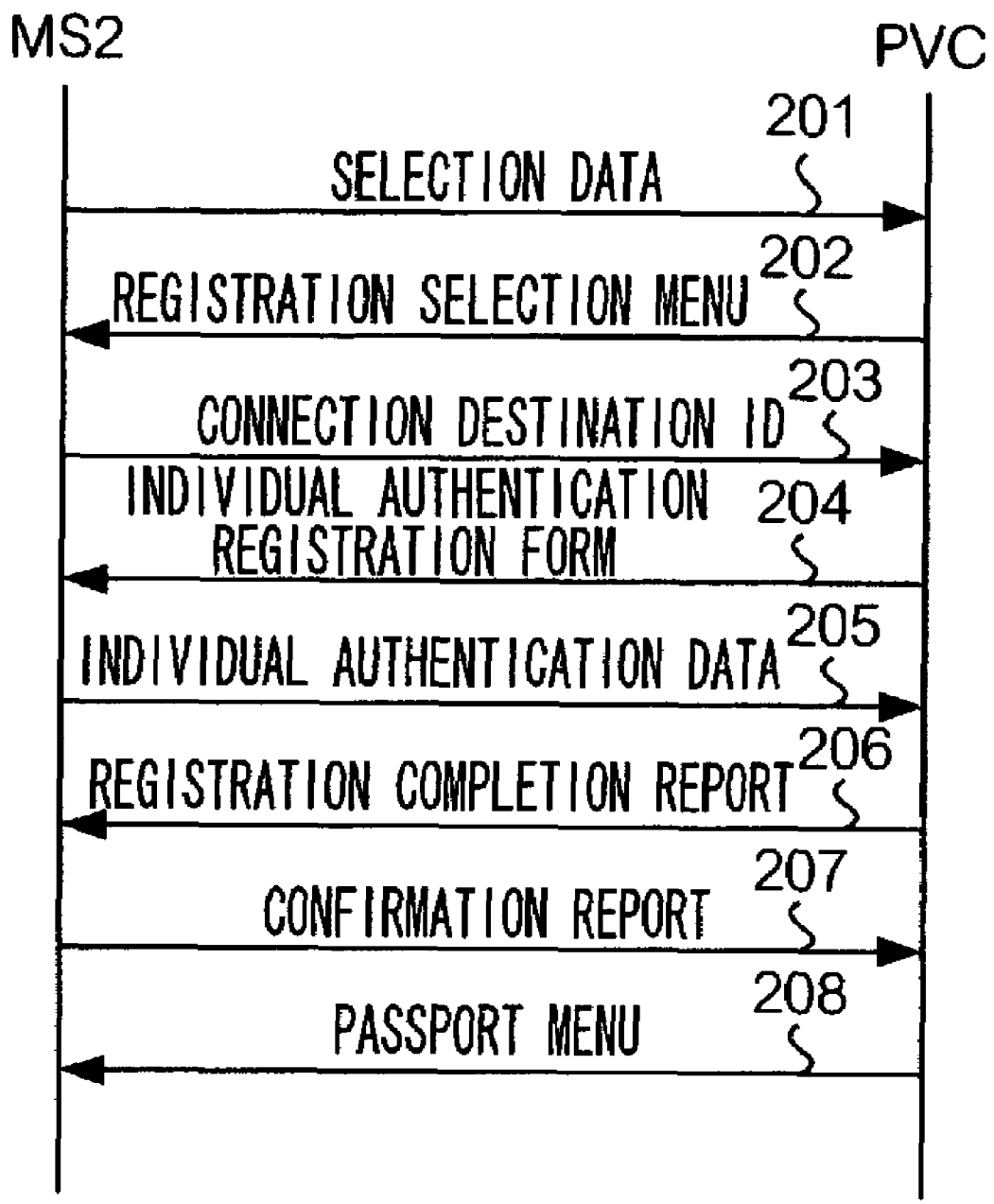
FIG. 10 is a diagram showing the flow of data at the time the user of the cellular phone MS2 of the first embodiment performs menu registration.

FIG. 10 is a diagram showing the flow of data at the time a member of the authentication undertaking service of the present embodiment registers a menu in the authentication service provided by the authentication undertaking apparatus PVC, from the cellular phone MS2 owned by the member. Here, we assume that the cellular phone MS2 has completed general authentication.

Here, we also assume that the phone number of the cellular phone MS2 and the appellation ("B" in this example) of the user of the cellular phone MS2 have already been stored in the individual table T1.

(Step 201): The cellular phone MS2 transmits to the authentication undertaking apparatus PVC a signal that includes selection data representing the shift to menu registration processing.

(Step 202): Upon receipt of the signal that includes the selection data, the authentication undertaking apparatus PVC transmits to the cellular phone MS2 a signal that includes a registration selection menu containing connection destination IDs of a plurality of sites.

(Step 203): Upon receipt of the signal that includes the registration selection menu, the cellular phone MS2 displays a screen for prompting the user to select a site (e.g., screen G134 of FIG. 7).

When a site has been selected, the cellular phone MS2 transmits to the authentication undertaking apparatus PVC a signal that includes the connection destination ID of the selected site.

(Step 204): Upon receipt of the signal that includes the connection destination ID, the authentication undertaking apparatus PVC transmits to the cellular phone MS2 a signal that includes an individual registration form.

(Step 205): When the cellular phone MS2 receives the signal that includes the individual registration form, on the basis of the individual registration form, the cellular phone MS2 displays a screen for prompting the user to input individual authentication data corresponding to the site (e.g., screen G135 of FIG. 7).

Upon input of the individual authentication data, the cellular phone MS2 transmits to the authentication undertaking apparatus PVC a signal that includes the individual authentication data.

(Step 206): Upon receipt of the signal that includes the individual authentication data, the authentication undertaking apparatus PVC performs menu registration.

The authentication undertaking apparatus PVC transmits to the cellular phone MS2 a signal that includes a registration completion report.

(Step 207): Upon receipt of the signal that includes the registration completion report, the cellular phone MS2 transmits to the authentication undertaking apparatus PVC a signal that includes a confirmation report.

(Step 208): Upon receipt of the signal that includes the confirmation report, the authentication undertaking apparatus PVC ends the menu registration processing. In the present embodiment, general authorization can be omitted immediately after completion of menu registration. Therefore, the authentication undertaking apparatus PVC transmits to the cellular phone MS2 a passport menu signal which enables the user to select an item for which the authentication service must be performed.

<A-5-2. Operation of Cellular Phone MS for Menu Registration Request>

(Step 201): When the user selects "New Registration" from the passport menu signal, the cellular phone MS2 transmits to the authentication undertaking apparatus PVC a signal that includes selection data representing the selection of "New Registration."

(Step 202): Upon receipt of the registration selection menu, the cellular phone MS2 displays on the display section 5 a screen (e.g., screen G134 of FIG. 7) for prompting the user to register an item for which authentication is to be undertaken.

(Step 203): When the user selects a desired item ("Quiz for Prize Contest" in this example), the cellular phone MS2 transmits to the authentication undertaking apparatus PVC a connection destination ID ("5" in this example) corresponding to the selected item.

(Step 204): When the cellular phone MS2 receives the individual authentication registration form, on the basis of the individual authentication registration form, the cellular phone MS2 displays on the display section 5 a screen (e.g., screen G135 of FIG. 7) for prompting the user to input an ID only.

(Step 205): Upon detection that the user has input an ID ("65883" in this example) and then depressed a transmission button, the cellular phone MS2 transmits the input ID to the authentication undertaking apparatus PVC as individual authentication data.

(Step 206): Upon receipt of a registration completion report (or a format error report), the cellular phone MS2 displays on the display section 5 a screen (e.g., screen G136 or G137 of FIG. 7) for notifying the user that new registration of the connection destination has been completed (or failed).

(Step 207): Upon detection that the user has depressed the "Next" button on the screen for reporting completion of registration or the screen for reporting a format error, the cellular phone MS2 transmits a confirmation report to the authentication undertaking apparatus PVC, and ends the menu registration request processing successfully (or unsuccessfully).

<A-5-3. Operation of Authentication Undertaking Apparatus PVC for Menu Registration Processing>

(Step 202): Upon receipt of a signal that includes selection data, the authentication undertaking apparatus PVC transmits to the cellular phone MS2 a registration selection menu for selecting an item for which authentication is to be undertaken.

Figure 11:
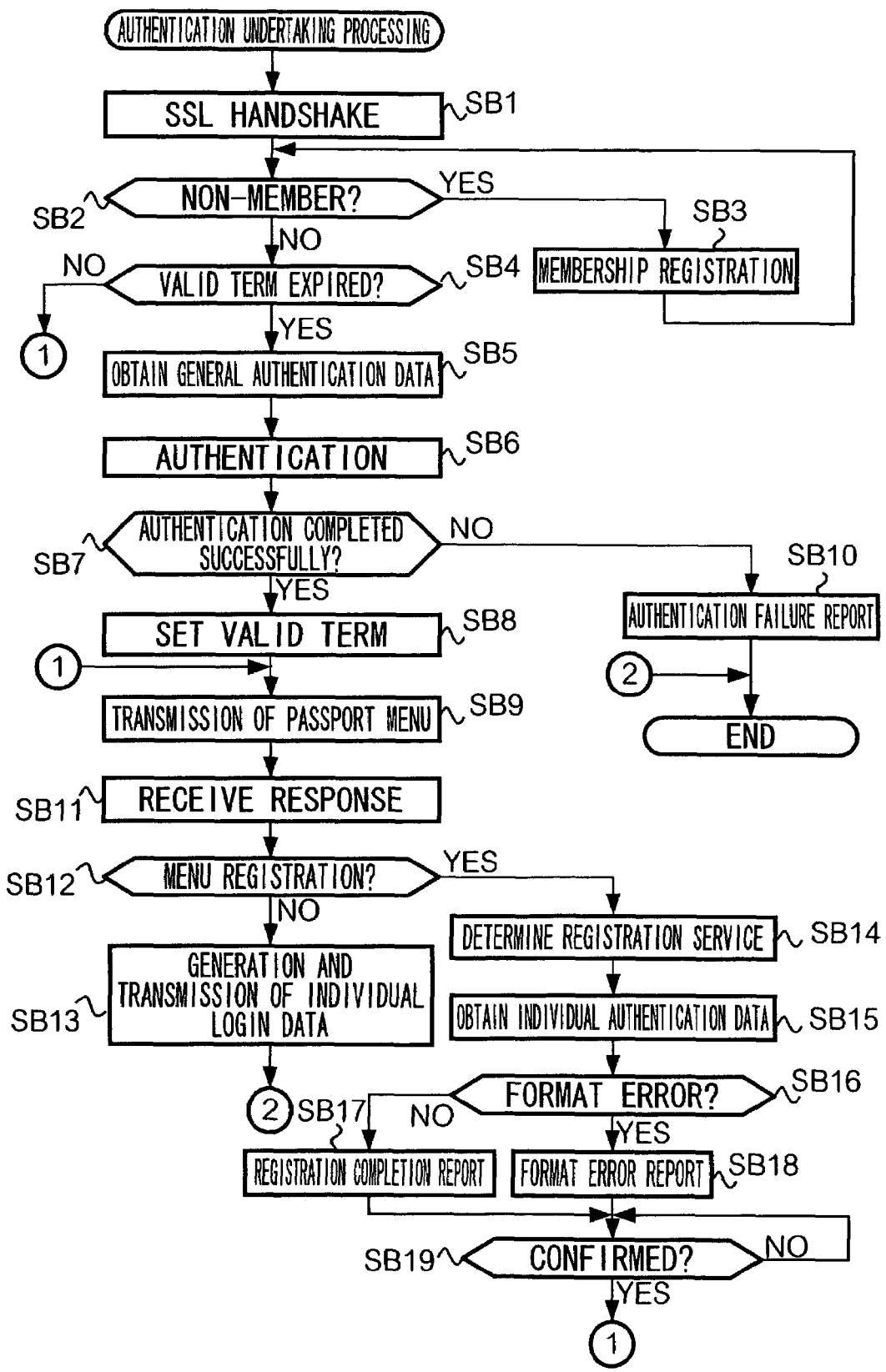
FIG. 11 is a flowchart showing the flow of authentication undertaking processing performed by the authentication undertaking apparatus PVC of the first embodiment.

This registration selection menu includes connection destination IDs and titles of all selectable connection destinations (step SB14 of FIG. 11).

(Step 204): Upon receipt of a connection destination ID, the authentication undertaking apparatus PVC extracts from the site table T2 a record specified by the connection destination ID.

The authentication undertaking apparatus PVC transmits to the cellular phone MS2 an individual authentication registration form corresponding to contents of the ID necessary/unnecessary field and password necessary/unnecessary field of the record (in this example, an ID is necessary, but a password is unnecessary) (step SB15 of FIG. 11).

(Step 206): Upon receipt of the ID, the authentication undertaking apparatus PVC judges whether the input ID satisfies the requirement regarding ID attribute stored in the ID attribute field of the record of the site table T2 (in this example, not less than 4 bytes but not greater than 8 bytes) (step SB16 of FIG. 11).

When the ID satisfies the ID attribute requirement, the authentication undertaking apparatus PVC stores "5" and "65883" to the connection destination ID field and ID field of the corresponding record (record whose member number is "2") of the individual table T1.

The authentication undertaking apparatus PVC transmits a registration completion report to the cellular phone MS2 (step SB17 of FIG. 11).

When the ID fails to satisfy the ID attribute requirement, the authentication undertaking apparatus PVC transmits a format error report to the cellular phone MS2 (step SB18 of FIG. 11).

(Step 208): Upon receipt of a signal that includes a confirmation report, the authentication undertaking apparatus PVC ends the menu registration processing (step SB19 of FIG. 11). In the present embodiment, general authorization can be omitted immediately after completion of menu registration. Therefore, the authentication undertaking apparatus PVC transmits to the cellular phone MS2 a passport menu signal which enables the user to select an item for which the authentication service must be performed.

<A-6. Authentication Undertaking Processing (Passport Menu)>

<A-6-1. General Description>

Figure 12:
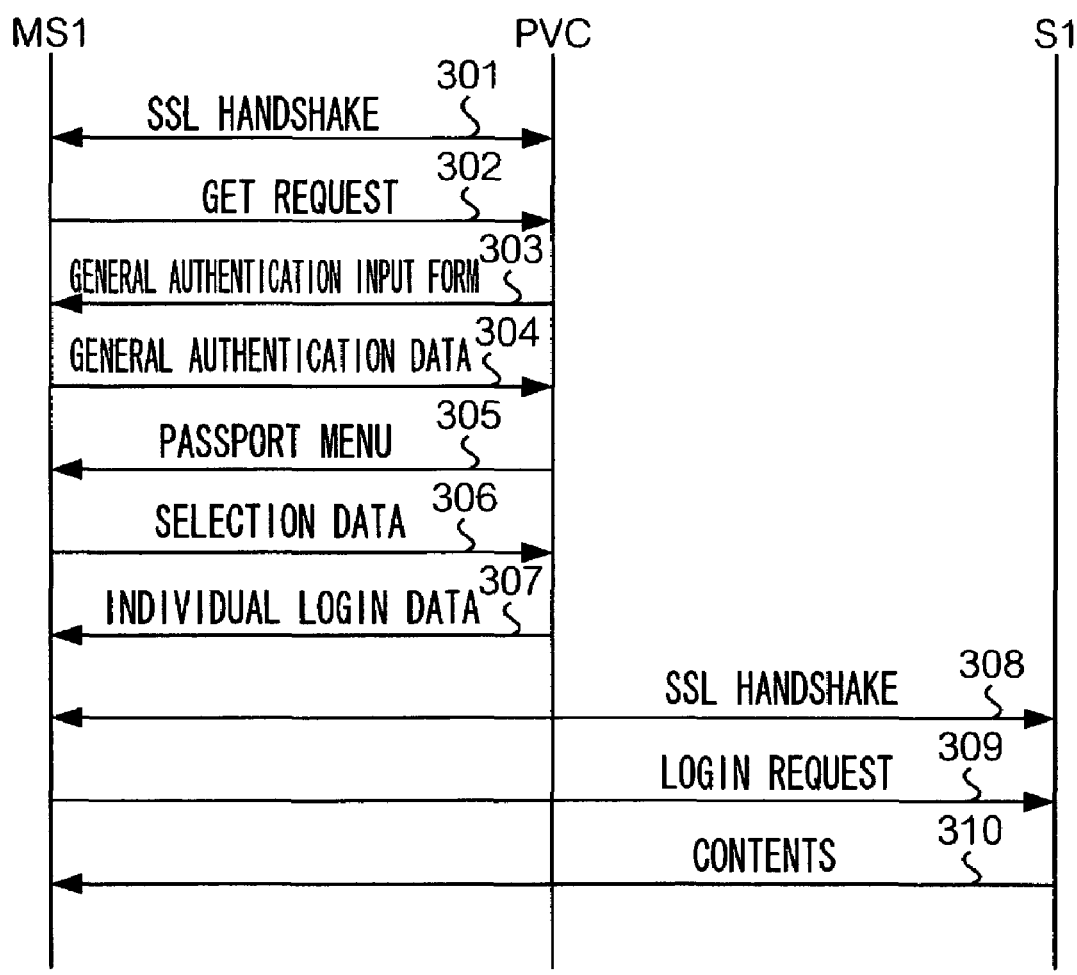
FIG. 12 is a diagram showing the flow of data at the time the user of the cellular phone MS1 of the first embodiment utilizes an authentication service according to the first embodiment.

FIG. 12 is a diagram showing the flow of data at the time a member of the authentication service of the present embodiment utilizes a members-only service provided by the site S1, while utilizing the authentication service provided by the authentication undertaking apparatus PVC, from the cellular phone MS1 owned by the member.

Here, we assume that the phone number of the cellular phone MS1 and the appellation ("C" in this example) of the user of the cellular phone MS1 have already been stored in the individual table T1.

We also assume that the member selected "Voice+Fingerprint" as an authentication level at the time of membership registration.

Further, we also assume that several hours or more has elapsed since the member has last utilized the authentication service from the cellular phone MS1.

(Step 301): SSL communication between the authentication undertaking apparatus PVC and the cellular phone MS1 starts.

(Step 302): Upon establishment of a SSL communication session, the cellular phone MS1 transmits to the authentication undertaking apparatus PVC a GET request signal that contains the phone number of the cellular phone MS1.

(Step 303): Upon receipt of the GET request signal, the authentication undertaking apparatus PVC transmits to the cellular phone MS1 a signal that includes data representing an authentication data input form.

(Step 304): Upon receipt of the signal that includes the data representing an authentication data input form, the cellular phone MS1 prompts the user of the cellular phone MS1 to input general authentication data.

When the user inputs general authentication data, the cellular phone MS1 transmits the input general authentication data to the authentication undertaking apparatus PVC.

(Step 305): Upon receipt of the general authentication data, the authentication undertaking apparatus PVC performs authentication processing.

When the authentication undertaking apparatus PVC completes the authentication processing successfully, the authentication undertaking apparatus PVC transmits to the cellular phone MS1 a passport menu signal which enables the user to select an item for which the authentication service must be performed.

When the authentication undertaking apparatus PVC fails in the authentication processing, the authentication undertaking apparatus PVC transmits an authentication failure report to the cellular phone MS1, and completes the authentication processing, having been unsuccessful.

(Step 306): Upon detection that the user has selected one site from the passport menu signal, the cellular phone MS1 transmits to the authentication undertaking apparatus PVC selection data that include data regarding the site.

(Step 307): Upon receipt of the selection data, the authentication undertaking apparatus PVC generates individual login data and transmits them to the cellular phone MS1.

(Step 308): Upon receipt of the individual login data, the cellular phone MS1 starts SSL communication with the site S1 in accordance with a method described in the individual login data.

(Step 309): When SSL communication has been started, the cellular phone MS1 longs in the site S1 in a manner described in the individual login data.

For the login of the user of the cellular phone MS1, the site S1 performs authentication processing with reference to the member information database CDB1.

(Step 310): When the site S1 completes the authentication successfully, the site S1 provides to the user the members-only service, including provision of contents.

When the site S1 fails in the authentication, the site S1 ends the authentication processing.

<A-6-2. Operation of Cellular Phone MS for Authentication Undertaking Request Processing>

(Step 301): Upon detection that the user of the cellular phone MS1 has selected "Passport" from the main menu (screen G111 of FIG. 7), the cellular phone MS1 starts SSL communication with the authentication undertaking apparatus PVC.

(Step 302): The cellular phone MS1 transmits to the authentication undertaking apparatus PVC a GET request that contains the phone number of the cellular phone MS1.

(Step 303): Upon receipt of a general authentication data input form including a tag that designates "Obtainment of Voice Signal and Fingerprint Image," the CPU 62 of the cellular phone MS1 displays on the display section 5 a screen (e.g., screen G112 of FIG. 15) for prompting input of general authentication data, on the basis of the input tag.

(Step 304): Upon detection of depression of the determination button 41 by the user, the CPU 62 turns the LED light source 43 on and records (photographs) an image captured by the CCD camera 42.

At this time, the CCD camera 42 photographs via the transparent plate 411 the front surface of the finger which has depressed the determination button 41.

Figure 9:
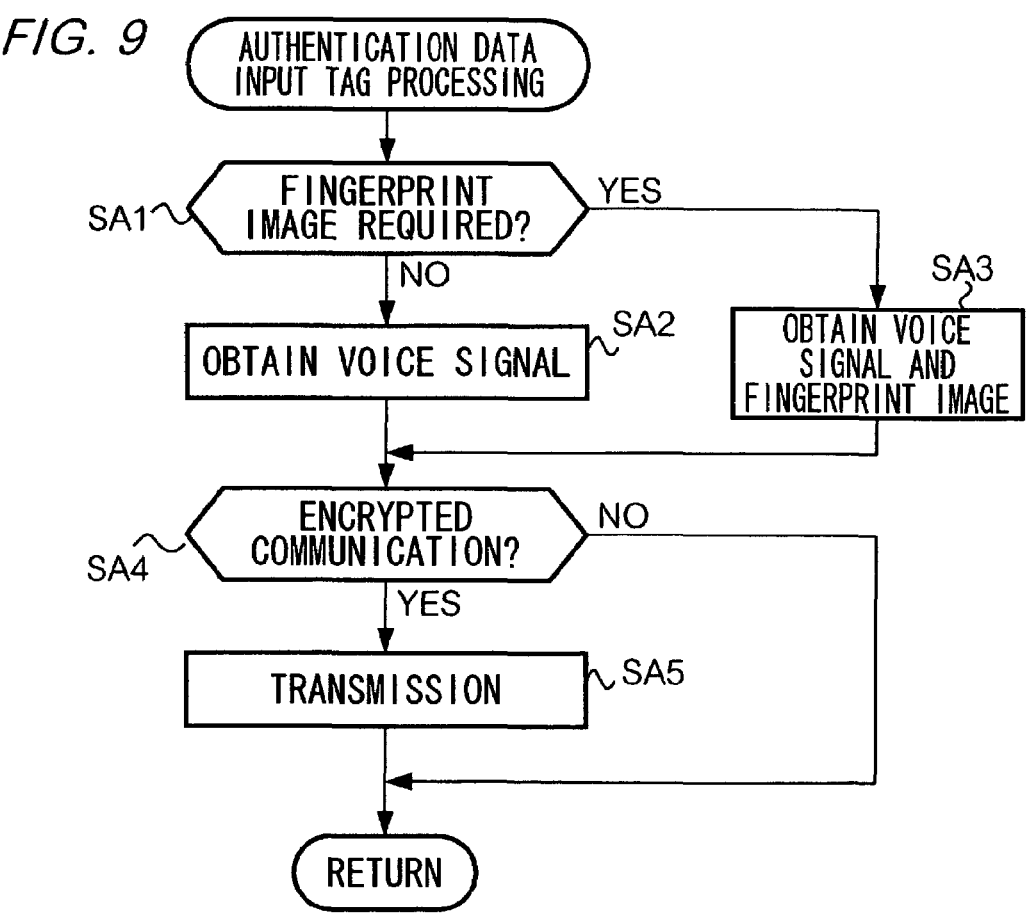
FIG. 9 is a flowchart showing the flow of processing which the cellular phone MS of the first and second embodiments performs when a tag for inputting authentication data is contained in HTML data.

At the time of the determination button 41 being depressed by the user, the CPU 62 obtains voice input from the sound input section 3 (steps SA1 and SA3 of FIG. 9).

The CPU 62 transmits the photographed fingerprint image and the voice to the authentication undertaking apparatus PVC, as general authentication data.

Figure 13:
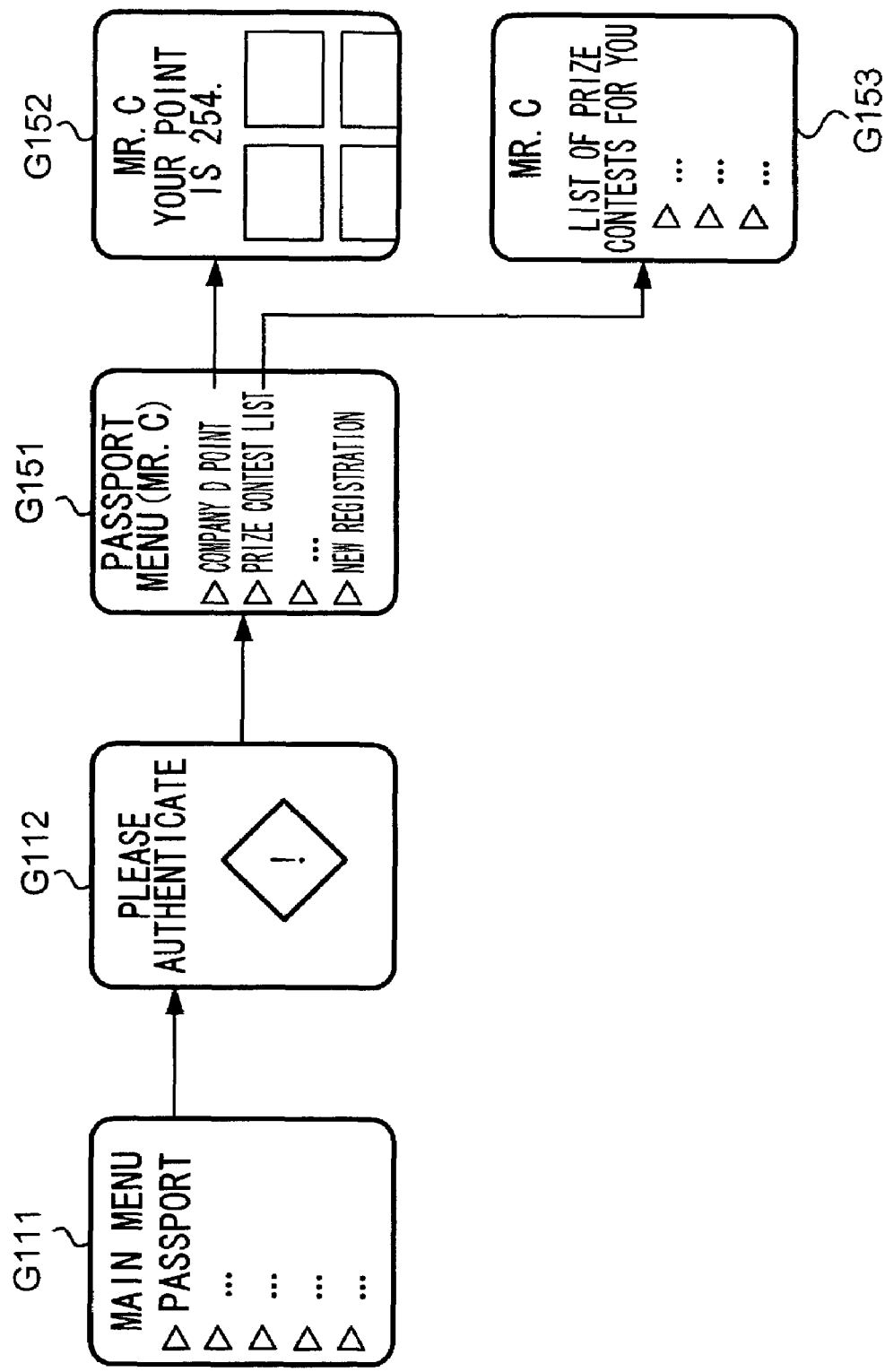
FIG. 13 is a diagram showing an example screen displayed on the cellular phone MS1.

(Step 305): Upon receipt of a passport menus signal, the cellular phone MS1 displays on the display section a screen (e.g., screen G151 of FIG. 13) for prompting selection of an item for which the authentication service is to undertake authentication processing.

(Step 306): Upon detection that the user has selected a site "Company D Point," the cellular phone MS1 transmits to the authentication undertaking apparatus PVC selection data that represent the selection of that site.

(Step 308): Upon receipt of individual login data, the cellular phone MS1 starts SSL communication with the site S1 described in the individual login data.

(Step 309): After the SSL communication with the site S1 has been started, the cellular phone MS1 transmits a sequence of the GET request described in the individual login data to a resource "//www.c.co.jp/point/point.cgi" which performs individual authentication processing at the site S1 described in the individual login data. This transmission replaces a manual login procedure.

(Step 310): Upon receipt of the GET request, the site S1 starts authentication processing for the cellular phone MS1. Since "docomo" and "********" have been correctly input as an ID and a password, respectively, the user of the cellular phone MS1 is authenticated to be a member of the service provided by the site S1.

After this, the site S1 transmits to the cellular phone MS1 personal service contents (data) for the user (in this example, the site S1 transmits to the cellular phone MS1 data that indicate a cumulative point of the cellular phone MS1 obtained through utilization of a shopping service provided by the site S1).

Upon receipt of the contents, the cellular phone MS1 displays on the display section 5 a screen (e.g., screen G152 of FIG. 7) for reporting the point the user has acquired.

<A-6-3. Operation of Authentication Undertaking Apparatus PVC for Authentication Undertaking Processing>

(Step 301): The authentication undertaking apparatus PVC and the cellular phone MS1 start SSL communication (step SB1 of FIG. 11).

(Step 302): Upon receipt of a GET request signal which includes the phone number of a cellular phone, the authentication undertaking apparatus PVC searches for a record containing the phone number, with reference to the individual table T1. When the authentication undertaking apparatus PVC has completed the search successfully, the authentication undertaking apparatus PVC extracts the record. Here, the record which stores "1" in the member number field is extracted (step SB2 of FIG. 11).

The authentication undertaking apparatus PVC obtains the present time and compares it with the time stored in the valid term field of the record. In the present example, a long period of time has elapsed since the user has last received the authentication service, and therefore the general authentication has expired (step SB4 of FIG. 11).

(Step 303): Since the authentication level of the record is "2," the authentication undertaking apparatus PVC transmits to the cellular phone MS1 an authentication data input form including an input tag that designates "Obtainment of Voice Signal and Fingerprint Image" (step SB5 of FIG. 11).

(Step 304): The authentication undertaking apparatus PVC receives voice and a fingerprint image as general authentication data (step SB5 of FIG. 11).

The authentication undertaking apparatus PVC generates voiceprint data and fingerprint data from the voice and the fingerprint image.

The authentication undertaking apparatus PVC collates the voiceprint data and the fingerprint data with the general authentication reference data (in this example, voiceprint reference data and fingerprint reference data) stored in the previously selected record.

At this time, the authentication undertaking apparatus PVC reads and decrypts the encrypted general authentication reference data stored in the record, uses the data for the collation, and discards the data after completion of the collation. In this manner, leakage of reference data is prevented (step SB6 of FIG. 11).

Figure 14:
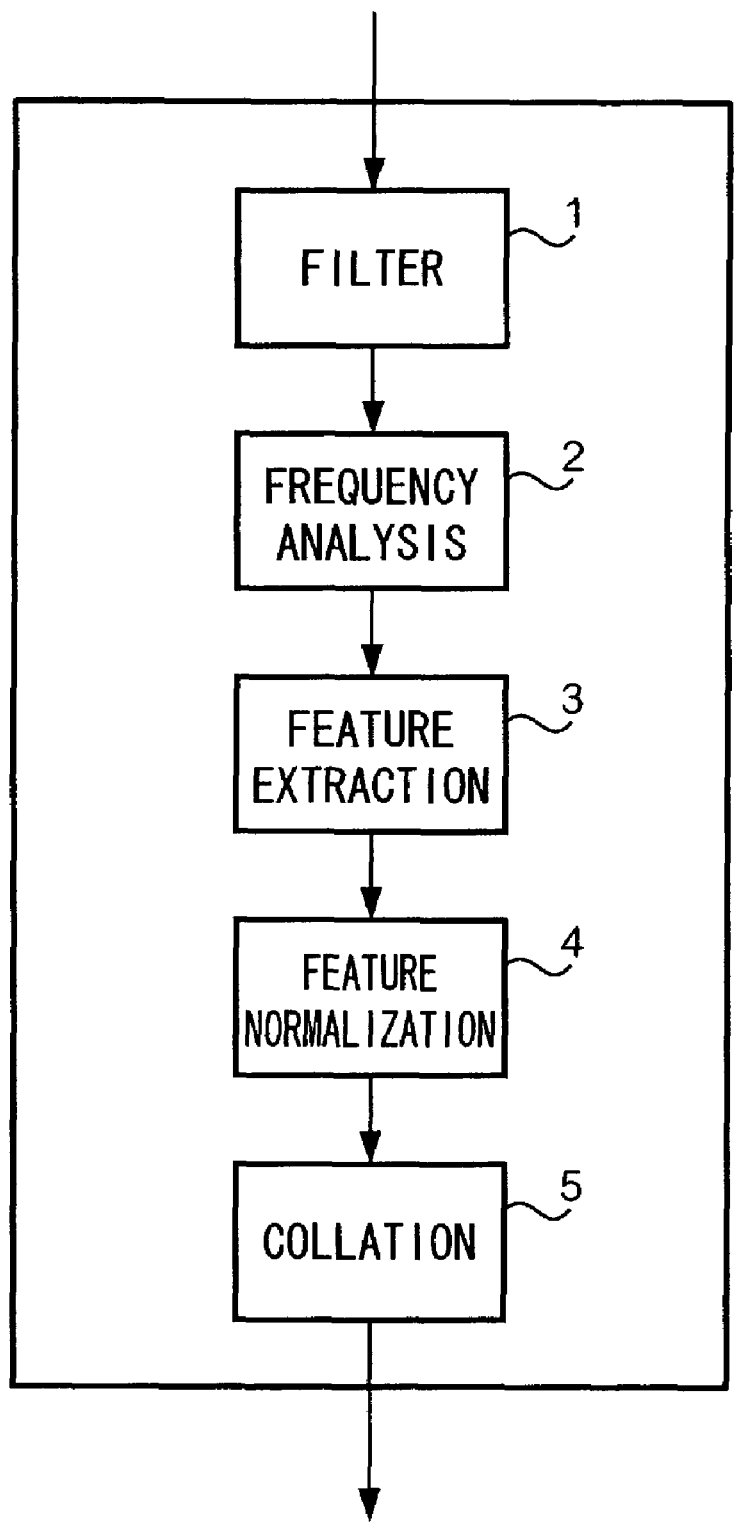
FIG. 14 is a conceptual diagram showing authentication processing performed in the authentication service according to the first embodiment.

FIG. 14 is a diagram showing the authentication processing step performed in the authentication undertaking apparatus. As shown in FIG. 14, the authentication processing step includes filter processing, frequency analysis processing, feature extraction processing, feature normalization processing, and collation.

(Filter processing): The authentication undertaking apparatus PVC removes from the received raw data, which contain data peculiar to the human body (in this example, fingerprint image or voice), signals outside a band that contains useful data.

(Frequency analysis processing): The authentication undertaking apparatus PVC subjects the filtered data to spatial or temporal frequency analysis processing.

(Feature extraction processing): The authentication undertaking apparatus PVC extracts from the signal subjected to the frequency analysis processing a feature parameter that characterizes the data peculiar to the human body to be obtained.

(Feature normalization processing): The authentication undertaking apparatus PVC normalizes the thus-obtained individual feature parameter to thereby obtain a normalized feature parameter.

(Collation): The authentication undertaking apparatus PVC collates the normalized feature parameter and the general authentication reference data. The collation in the present embodiment may be performed by a method based on pattern matching.

When the authentication undertaking apparatus PVC have succeeded in the collation, a time which is later than the present time by a certain period (e.g., 30 min) is stored in the valid term field of the record (step SB8 of FIG. 11).

(Step 305): With reference to individual table T1, the authentication undertaking apparatus PVC obtains a record for the user of the authenticated cellular phone, and extracts a plurality of registered connection destination IDs. Subsequently, the authentication undertaking apparatus PVC refers to the site table T2 while using the extracted connection destinations IDs as keys and extracts the titles and classifications of the sites from records corresponding to the connection destinations IDs.

The authentication undertaking apparatus PVC generates a passport menu signal that includes data representing the titles and the connection destination IDs of the extracted connection destinations. In this case, there is generated a passport menu signal that includes a title "Company D Point" corresponding to the connection destination whose connection destination ID is "7" and the connection ID "7"; and a title "Prize Contest List" corresponding to the connection destination whose connection destination ID is "5" and the connection ID "5."

In the present embodiment, the authentication undertaking apparatus PVC adds connection information entitled "New Registration" to the passport menu signal.

The authentication undertaking apparatus PVC transmits to the cellular phone MS1 a passport menu signal which has been generated in the above-described manner and enables the user to select an item for which the authentication service is to be performed (step SB9 of FIG. 11).

(Step 306): Upon receipt of the selection data, the authentication undertaking apparatus PVC judges the type of the selection data. When the selection data require registration of a new menu, the authentication undertaking apparatus PVC proceeds to menu registration processing (step SB12 of FIG. 11). Here, we assume that the connection destination ID "7" has been selected.

(Step 307): The authentication undertaking apparatus PVC generates individual login data by referring to the individual tables T1 and T2 while using the connection destination ID contained in the selection data as a key.

The individual login data are HTML data which are described so as to automatically send a GET request when the individual login data are interpreted and executed. The individual login data are described in such a manner that the GET request includes a sequence for transferring individual authentication data to a connection destination corresponding to the connection destination ID. Here, the individual login data are generated from the member number "1" and the individual login data that are required by a site whose connection destination ID is "7" and whose title is "Company D Point."

The authentication undertaking apparatus PVC transmits the individual login data to the cellular phone MS1 and then ends the authentication undertaking processing (step SB13 of FIG. 11).

<A-6B. Valid Term of General Authentication Data and Omission of Input of General Authentication Data>

The flowchart of the authentication undertaking apparatus shown in FIG. 10 shows two cases in which input of general authentication data is omitted and individual authentication undertaking processing is performed.

In the first case, after completion of membership registration (step SB3), the authentication undertaking apparatus PVC proceeds from step SB2 to step SB4. In this case, at the time of membership registration, a time which is later than the time of membership registration is set as a valid term, and therefore, the present time is judged to be within the valid term of the general authentication. Therefore, the authentication undertaking apparatus PVC can proceed to the passport menu (step SB9) while omitting general authentication processing. In this manner, the authentication undertaking apparatus PVC permits the user to use the passport menu after the membership registration. During this operation, the screen of the cellular phone changes from the screen G132 to the screen G138 and then to the screen G139 of FIG. 7.

In the second case, after completion of menu registration (step SB19), the authentication undertaking apparatus PVC proceeds to step SB4. Through setting the valid term in such a manner that the general authentication is still valid at this point in time, the user can select a site which the user has added to the passport menu by means of menu registration, and then receives the authentication service therefor. However, when the valid term of the general authentication data expires during the course of site registration, the general authentication data must be input again.

Figure 15:
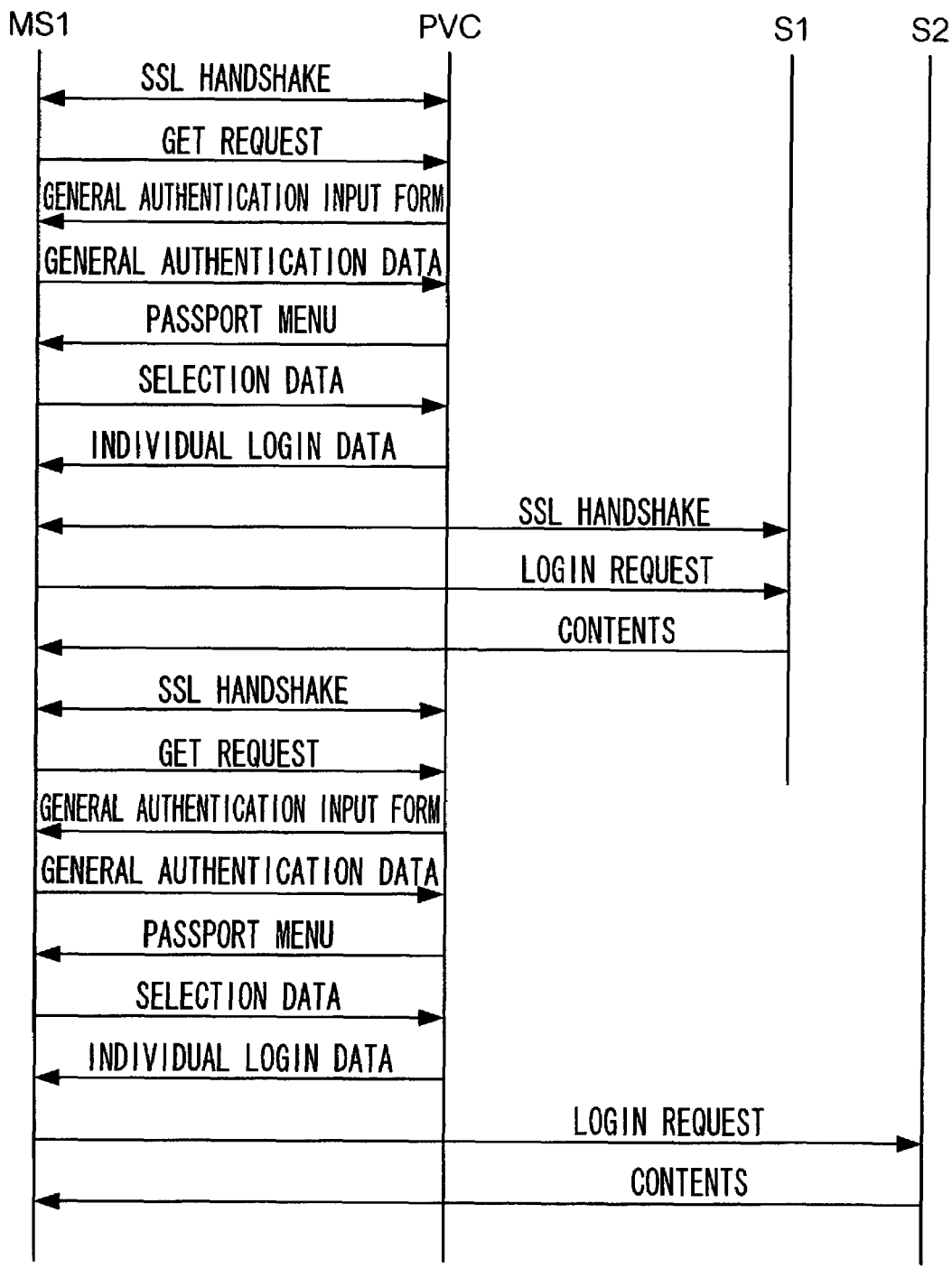
FIG. 15 is a diagram showing the flow of data at the time the user of the cellular phone MS1 uses the authentication service according to the first embodiment in order to utilize a plurality of sites S1 and S2.

In the third case, the member of the authentication service of the present embodiment shown in FIG. 15 utilizes the site S2 after usage of the site S1, by use of the cellular phone MS1 that the member owns. During this operation, the screen of the cellular phone changes from the screen G151 to the screen G152, then to the screen G151, and then to G153 of FIG. 13. However, when the valid term of the general authentication data expires during usage of the site S1, the general authentication data must be input again before usage of the site S2.

As described above, the authentication undertaking apparatus PVC maintains a balance between convenience of users and security by managing the valid term of the general authentication data.

<C-6C. Fraudulent Utilization of Authentication Service>

Here, we assume that a third party (hereinafter referred as a user) has picked up a cellular phone MS3 owned by a registered member (member number: "3") of the authentication undertaking service and tries to receive the authentication undertaking service. We also assumes that the user has picked up the cellular phone MS3 several hours after the registered member has last utilized the authentication undertaking service.

Figure 16:
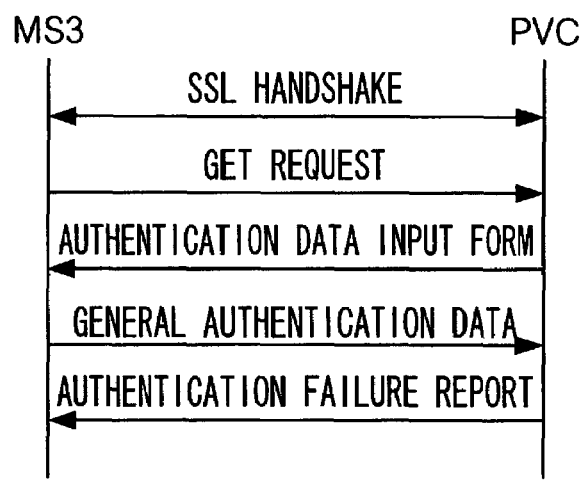
FIG. 16 is a diagram showing the flow of data at the time the user of the cellular phone MS3 uses an authentication undertaking service.

In this case, as shown in FIG. 16, when the user selects "Passport" from the main menu (screen G111 of FIG. 17) by operating the cellular phone MS3, a connection request is transmitted from the cellular phone MS3 to the authentication undertaking apparatus PVC. As a result, SSL handshaking is performed between the cellular phone MS3 and the authentication undertaking apparatus PVC, and SSL communication therebetween becomes possible (step SB1 of FIG. 11).

Next, a GET request corresponding to the selection of "Passport" is transmitted from the cellular phone MS3 to the authentication undertaking apparatus PVC. Upon receipt of the GET request, the authentication undertaking apparatus PVC searches the individual table T1 while using as a key the phone number contained in the GET request (step SB2 of FIG. 11). As a result, a record in which "3" is stored in the member number field is extracted. Since a time before the present time is stored in the valid term field of the record, an authentication data input form prepared on the basis of that record is transmitted from the authentication undertaking apparatus PVC to the cellular phone MS3 as a response to the GET request (steps SB4 and SB5 of FIG. 11). Notably, since "1" is stored in the authentication level field of the record which includes "3" in the member number field thereof, a tag that designates "Obtainment of Voice Signal" is incorporated into the authentication data input form as an input tag.

Figure 17:
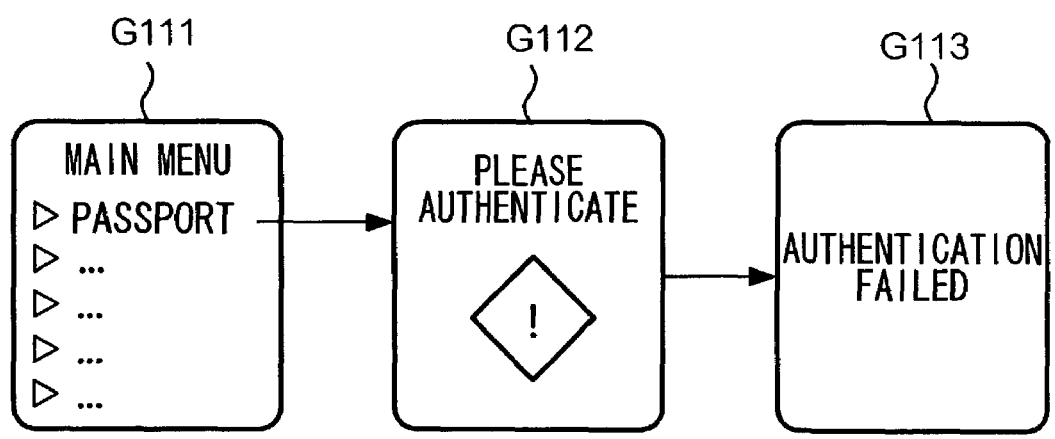
FIG. 17 is a diagram showing an example screen displayed on the cellular phone MS3.

Upon receipt of the authentication data input form, the cellular phone MS3 interprets and executes the authentication data input form in order to display a screen for prompting input of general authentication data (e.g., screen G112 of FIG. 17). Having viewed this screen, the user depresses the determination button 41 while producing voice, and a voice signal input from the sound input section 3 at that time is transmitted to the authentication undertaking apparatus PVC as general authentication data.

Upon receipt of the voice signal as general authentication data, the authentication undertaking apparatus PVC generates voiceprint data from the voice signal and collates the voiceprint data with the voiceprint data stored in the previously selected record (steps SB5 and SB6 of FIG. 11). Since the latter voiceprint data are of the registered member, the two data sets do not match. Therefore, the authentication undertaking apparatus PVC judges authentication to have failed, and an authentication failure report is transmitted from the cellular phone MS3 to the authentication undertaking apparatus PVC (steps SB7 and SB10 of FIG. 11). As a result, a screen indicating failure in general authentication (e.g., screen G112 of FIG. 17) is displayed on the cellular phone MS3.

<A-7. Insurance, Charging Processing>

Figures 18, 19:
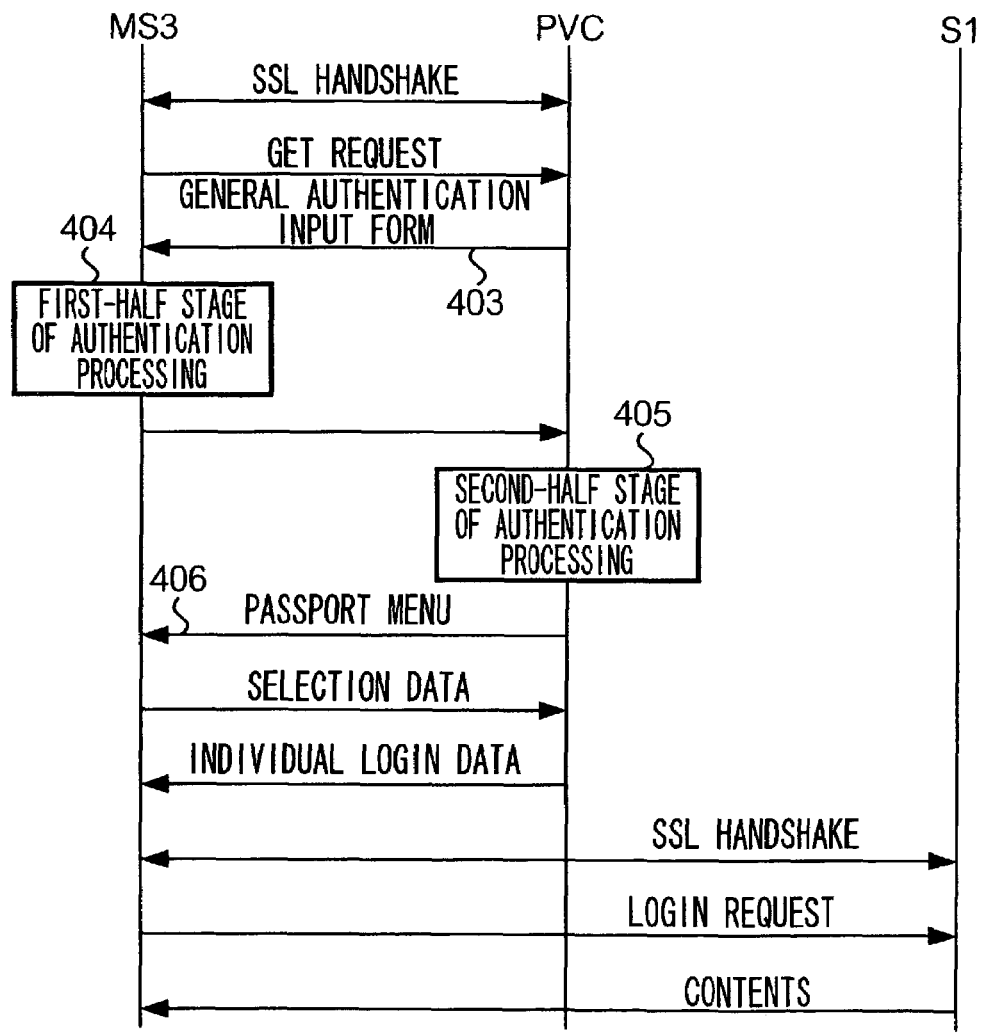
FIG. 18 is a table showing authentication levels of the authentication systems used in the first and second embodiments.
FIG. 19 is a diagram showing the flow of data at the time when the user of the cellular phone MS3 utilizes an authentication service according to the second embodiment.

In the authentication system of the present invention, an insurance premium is determined on the basis of an authentication level which the user has selected at the time of membership registration and which is utilized for general authentication. In the present embodiment, first to third authentication levels are provided, and, as shown in FIG. 18, collation data to be used and an insurance premium are set for each of these levels.

The authentication undertaking apparatus PVC stores an authentication level selected by the user in the authentication level field of the individual table T1 and stores an insurance premium corresponding to the authentication level in the insurance premium field.

At a certain time, the authentication undertaking apparatus PVC charges each of the plurality of users of the terminal apparatuses an amount of money obtained through addition of an insurance premium and a usage fee stored in the corresponding fields of the individual table T1.

At this time, the authentication undertaking apparatus PVC may generate charge data including the above-described amount and the phone number of the terminal apparatus and transmit the data to the mobile communication network MPN to thereby leave the charging processing to the mobile communication network MPN.

The mobile communication network MPN charges the user of the terminal apparatus an amount of money obtained by adding a communication fee to the above charge.

<A-8. Site Registration Processing>

The authentication system of the present embodiment has a function of adding a record to the site table T2 of the authentication undertaking apparatus PVC.

Through execution of an agent program, the authentication undertaking apparatus PVC collects data regarding sites which are connected to the Internet and which provide members-only services, and automatically adds a record to the site table T2 for each of the sites in order to effect site registration.

The agent program collects on the Internet HTML data which include a sequence for enabling a member to transfer an ID and a password to an authentication program described for each site. The agent program analyzes the collected HTML data and detects tags indicating ID input and password input from the HTML data, judges attributes (data representing the number and types of usable characters) that are required for the ID and password, and stores them into the ID attribute field and password attribute field of the site table T2.

Further, on the basis of data which are contained in the site from which the HTML data have been collected and which are designated by tags, the agent program may try to classify the site and store a corresponding classification name in the classification field of a record of the site table T2 corresponding to the site.

Moreover, the authentication undertaking apparatus PVC of the present embodiment has a function of changing the contents of the connection data field, classification field, ID necessary/unnecessary field, password necessary/unnecessary field, ID attribute field, and password attribute field of an arbitrary record of the site table T2 in accordance with an instruction from the outside (e.g., an operator of the site S1).

B. Second Embodiment

The configuration of the authentication system according to a second embodiment of the present invention is the same as that of the first embodiment, which is shown by the block diagram of FIG. 1.

<B-1. Authentication Undertaking Processing>

FIG. 19 is a diagram showing the flow of data at the time a member of the authentication service of the present embodiment utilizes a members-only service provided by the site S1, while utilizing the authentication service provided by the authentication undertaking apparatus PVC, from the cellular phone MS3 owned by the member.

Here, we assume that the user of the cellular phone MS3 who utilizes the authentication service has selected the authentication level "1"; i.e., "Use of Voiceprint Data" at the time of membership registration.

We also assume that the user of the authentication undertaking service has not utilized the authentication undertaking service for a considerably long period of time.

Since the processing shown in FIG. 19 and the authentication processing of the first embodiment shown in FIG. 12 have many common portions, only portions that differ will be described.

(Step 403) Upon receipt of a general authentication data input form including a tag that designates "Obtainment of Voice Signal," the CPU 62 of the cellular phone MS3 displays on the display section 5 a screen for prompting input of general authentication data (e.g., screen G112 of FIG. 13), on the basis of the input tag.

(Step 404) The CPU 62 obtains voice which is received from the sound input section 3 at the time of the determination button 41 being depressed by the user.

The CPU 62 subjects the obtained voice signal to a first-half stage of the authentication processing.

In the present embodiment, the first-half stage of the authentication processing includes filter processing, frequency analysis processing, feature extraction processing, and feature normalization processing.

After completion of the first-half stage of the authentication processing, the cellular phone MS1 transmits normalized feature data to the authentication undertaking apparatus PVC.

(Step 405): Upon receipt of the normalized feature data, the authentication undertaking apparatus PVC collates the received normalized feature data with the general authentication reference data stored in the corresponding record of the individual table T1, as a second-half stage of the authentication processing.

Upon attaining success in collation, the authentication undertaking apparatus PVC transmits a passport menu signal to the cellular phone MS3.

<C. Modifications>

<C-1. Modification 1>

When the authentication system of the embodiments performs general authentication processing, the system searches the individual table T1 while using a phone number assigned to a cellular phone MS. However, the general authentication processing may be performed in such a manner that the individual table T1 is searched while an ID of the user of the cellular phone MS is used as a key, instead of the phone number thereof. Further, the general authentication processing may be performed in such a manner that the individual table T1 is searched while the data peculiar to the body of the phone user is used as a key. In this case, a user of the authentication service of the embodiments can utilize the authentication service while borrowing a cellular phone MS of another person.

<C-2. Modification 2>

The authentication system of the embodiments always performs collation of voiceprint data during general authentication. However, the authentication system may perform collation of fingerprint data without performance of collation of voiceprint data. In this case, the authentication undertaking apparatus PVC writes an authentication level "2," for example, in the authentication level field of the corresponding user's record of the individual table T1. Further, the authentication undertaking apparatus PVC writes an insurance premium "50" in the insurance premium field of the corresponding record.

<C-3. Modification 3>

The authentication system of the embodiments may utilize general authentication data which include data peculiar to the human body such as an iris pattern. Further, the authentication system of the embodiments may utilize general authentication data which include data, other than data peculiar to the human body, which can secure a high level of security.

<C-4. Modification 4>

The authentication system of the embodiments may be modified so as to enable a person other than a subscriber of a portable terminal to utilize the system. For example, in order to enable a substitute of the subscriber to utilize the authentication undertaking service when the subscriber becomes unable to input general authentication data due to an injury, a field for a substitute is added to the record of the subscriber in the individual table T1, and voiceprint data (and fingerprint data) of the substitute are stored in the field. The method by which the substitute stores the voiceprint data (and fingerprint data) is arbitrary.

<C-5. Modification 5>

The authentication undertaking apparatus PVC of the embodiments may serve as a gateway server GWS as well. In this case, the authentication undertaking apparatus PVC can perform the general authentication processing while utilizing origination (caller) IDs of cellular phones MS authenticated by the gateway server GWS, as data fixedly assigned to terminal apparatuses. In this case, if security can be secured, unencrypted communications may be performed between cellular phones within the mobile communication network MPN and the authentication undertaking apparatus PVC (=gateway server GWS), and encrypted communications may be carried out between the gateway server GWS and the sites S (S1 and S2) only. That is, the system may be modified in such a manner that encrypted communications are carried out between servers only.

<C-6. Modification 6>

The authentication system of the embodiments may be modified in order to enable a user to add to a passport menu signal a site which has not been registered in the passport menu signal, as an item for which the authentication service must be performed.

At the time of menu registration, the user of the cellular phone MS designates addition of a site which has not been registered in the passport menu signal and manually inputs the title, connection data, classification, necessity/non-necessity of ID and password, individual authentication data (ID and password) of the site to be added.

Upon receipt of data regarding the site to be added, the authentication undertaking apparatus PVC adds the data regarding the additional site to a record of the individual table T1 for the user. At this time, the authentication undertaking apparatus PVC allocates a new connection destination ID with reference to the site table T2.

The authentication undertaking apparatus PVC may perform the addition of the site through addition, to the individual table T1, of a new field for storing connection data of a site.

Alternatively, the authentication undertaking apparatus PVC may perform the addition of the site through an operation of adding a record to the site table T2 and storing the received data of the additional site in the record. Further, the authentication undertaking apparatus PVC may be modified in such a manner that the authentication undertaking apparatus PVC does not request the user to input data indicating whether an ID and a password are necessary, and judges whether an ID and a password are necessary through analysis of the received individual authentication data.

<C-7. Modification 7>

The terminal apparatus of the embodiments is not limited to a cellular phone having a browser; other examples of the terminal apparatus of the embodiments include a cookie acceptable terminal apparatus which is connected to a stationary phone before use and which can handle cookies, such as a desktop computer or a set top box having a browser; a cookie unacceptable terminal which is connected to a stationary phone before use and which cannot handle cookies, such as a PDA (Persona Data Assistant) or a portable game machine; a cookie acceptable terminal apparatus which has a cellular phone function and which is used in combination with an SIM (Subscriber Identity Module) or a UIM (User Identify Module); a cookie unacceptable terminal which is connected a cellular phone before use; and a cookie unacceptable terminal which is used in combination with an SIM or a UIM.

The terminal apparatus of the embodiments which can use cookies may record in a cookie an ID which specifies a user and use the ID as data fixedly assigned to the terminal apparatus during the general authentication processing.

The terminal apparatus of the embodiments which use a cellular phone (or SIM or UIM) may use a phone number fixedly assigned to the cellular phone (or SIM or UIM) as data fixedly assigned to the terminal apparatus during the general authentication processing.

Further, the cellular phone of the embodiments may be a cellular phone which can use cookies. In this case, the cellular phone of the embodiments which can use cookies may record in a cookie an ID which specifies a user and may use the ID as data fixedly assigned to the cellular phone terminal during the general authentication processing.

<C-8. Modification 8>

The terminal apparatus of the embodiments may be a cellular phone MS which does not have a function for inputting fingerprint images. The terminal apparatus of the embodiments may be a cellular phone MS which cannot detect a general authentication data input tag.

The present invention is not limited to the above-described specific embodiments and may be modified arbitrarily within the scope described in the claims.

<D. Supplementary Description>

As described above, the embodiments of the present invention eliminate the necessity of memorizing individual authentication data (an ID and a password) even when the user of a cellular phone utilizes various personal services which require input of an ID and a password in order to secure security. Further, since the individual authentication data are not stored in the cellular phone, even when the cellular phone falls into the possession of a third party, the individual authentication data are not leaked.

Further, the embodiments of the present invention can reliably prevent fraudulent use of the authentication undertaking service by a third party. In particular, since data peculiar to the human body, such as voiceprint data and fingerprint data, serve as general authentication data, authentication of a person himself or herself can be performed more reliably, as compared with the case in which a password or password number is used. Moreover, since the user does not have to memorize such data peculiar to the human body, the burden imposed on the user can be reduced.

Further, the embodiments of the present invention can provide the authentication service to a user of a cellular phone MS2 which does not have a function for obtaining a fingerprint image. Therefore, the user can utilize the service without replacing a presently-used terminal with a newly-bought terminal. Further, use of a cellular phone having a function for inputting voice eliminates the necessity of newly providing hardware for voiceprint authentication.

Moreover, a CCD camera is provided within a button for instructing input and transmission of general authentication data, and a finger which is present on the button during input of the general authentication data is photographed so as to obtain a fingerprint image. Therefore, a user can input and transmit a fingerprint image through a single operation. This is particularly advantageous in the case of a portable terminal, such as a cellular phone, in which quick button operation is difficult.

Further, a valid term is set for general authentication, and within the valid term, a user can utilize the authentication undertaking service without performance of general authentication. This reduces users' trouble. Moreover, before a form for prompting input of individual authentication data is transmitted from a site to a cellular phone, individual authentication data are transferred to an authentication program which performs collation of the individual authentication data at the site. Therefore, the user can skip the processing regarding the form so as to obtain a desired page.

Further, the provision of a plurality of selectable authentication levels enables provision of various services, and therefore, the possibility that a user can receive a desired service increases. For example, proper services can be provided to a user who wishes to utilize the service by use of an old cellular phone which lowers the reliability of authentication, a user who wishes to shorten the time necessary for authentication processing which may result in lowered reliability, and a user who wishes to secure security even if the time and labor necessary for authentication processing increase.

Moreover, a plurality of authentication levels are provided; and a low insurance premium is set when a high authentication level is selected. Therefore, provision of a variety of services at sites and encouragement of user's movement to a higher authentication level can be realized simultaneously. Further, a company which provides the authentication undertaking service can avoid risks caused by provision of services at a lower authentication level.

Further, in the embodiments of the present invention, not only general authentication data but also the phone number of a cellular phone is used as an essential element of general authentication. Therefore, not only propriety of a user but also propriety of a combination of a user and a cellular phone can be authenticated. In particular, since a cellular phone is carried by a user, general authentication can be performed with high accuracy without restricting behavior of the user.

Further, the embodiments of the present invention enables provision of authentication service which a member can use easily and safely in order to utilize a site from a terminal apparatus. Thus, the embodiments of the present invention can improve the value attained through provision of the is service. Further, since a user can utilize a variety of services easily and safely, the user's desire of utilizing members-only services which require authentication is expected to increase.

INDUSTRIAL APPLICABILITY

The present invention provides an authentication system which raises the desire of users to utilize services provided by sites which require input of authentication data. The present invention further provides an authentication undertaking apparatus and a terminal apparatus which constitute the authentication system.

The invention claimed is:

1. An authentication undertaking apparatus communicating in a communication network with a plurality of terminal apparatuses, each terminal apparatus being connectable to said communication network via communication means and connectable to a plurality of websites via said communication network, the authentication undertaking apparatus comprising:
   an authentication database for storing, for each user of said terminal apparatuses, a plurality of individual authentication data sets for input into said websites;
   authenticating means for authenticating the user of each terminal apparatus through utilization of at least either data fixedly assigned to said terminal apparatus or data peculiar to the user;
   specifying means for specifying a website which the user authenticated by said authenticating means wishes to utilize;
   generating means for generating individual login data based on individual authentication data in the authentication database corresponding to the user and the specified website; and
   transmitting means for transmitting the individual login data directly to the terminal apparatus at which the user is resident via an HTML webpage,
   wherein the individual login data generated by the generating means comprises HTML data to be submitted by the terminal apparatus at which the user is resident for access to the specified website.

2. An authentication undertaking apparatus according to claim 1, wherein said terminal apparatus includes obtaining means for obtaining data peculiar to a human body; and the user of said terminal apparatus is authenticated by use of the data peculiar to the human body.

3. An authentication undertaking apparatus according to claim 2, wherein the data peculiar to the human body include fingerprint data and voiceprint data.

4. An authentication undertaking apparatus according to claim 2, wherein the data peculiar to the human body include fingerprint data.

5. An authentication undertaking apparatus according to claim 2, wherein the data peculiar to the human body include voiceprint data.

6. An authentication undertaking apparatus according to claim 1, wherein the data fixedly assigned to said terminal apparatus is a phone number of said terminal apparatus.

7. An authentication undertaking apparatus communicating in a communication network with a plurality of terminal apparatuses, each terminal apparatus being connectable to said communication network via communication means and connectable to a plurality of websites via said communication network, the authentication undertaking apparatus comprising:
   an authentication database for storing, for each user of said terminal apparatuses, a plurality of individual authentication data sets for input into said websites;
   authenticating means for authenticating the user of each terminal apparatus through utilization of at least either data fixedly assigned to said terminal apparatus or data peculiar to the user;
   specifying means for specifying a website which the user authenticated by said authenticating means wishes to utilize;
   generating means for generating individual login data based on individual authentication data in the authentication database corresponding to the user and the specified website;
   transmitting means for transmitting the individual login data directly to the terminal apparatus at which the user is resident via an HTML webpage; and
   enabling means for enabling the user to select an authentication level from a plurality of authentication levels provided in said authenticating means,
   wherein the individual login data generated by the generating means comprises HTML data to be submitted by the terminal apparatus at which the user is resident for access to the specified website.

8. An authentication undertaking apparatus according to claim 7, wherein said terminal apparatus includes obtaining means for obtaining data peculiar to a human body; and
   said authenticating means authenticates the user of said terminal apparatus by use of data including the data peculiar to the human body.

9. An authentication undertaking apparatus according to claim 7, wherein the data fixedly assigned to said terminal apparatus is a phone number of said terminal apparatus.

10. An authentication undertaking apparatus communicating in a communication network with a plurality of terminal apparatuses, each terminal apparatus being connectable to said communication network via communication means and connectable to a plurality of websites via said communication network, the authentication undertaking apparatus comprising:
    an authentication database for storing, for each user of said terminal apparatuses, a plurality of individual authentication data sets for input into said websites;
    authenticating means for authenticating the user of each terminal apparatus through utilization of at least either data fixedly assigned to said terminal apparatus or data peculiar to the user;
    specifying means for specifying a website which the user authenticated by said authenticating means wishes to utilize;
    generating means for generating individual login data based on individual authentication data in the authentication database corresponding to the user and the specified website;
    transmitting means for transmitting the individual login data directly to the terminal apparatus at which the user is resident via an HTML webpage;
    enabling means for enabling the user to select an authentication level from a plurality of authentication levels provided in said authenticating means wishes to utilize; and
    charging means for charging the user an insurance premium on the basis of the authentication level selected by use of said enabling means, wherein the individual login data generated by the generating means comprises HTML data to be submitted by the terminal apparatus at which the user is resident for access to the specified website.

11. An authentication undertaking apparatus according to claim 10, wherein said terminal apparatus includes obtaining means for obtaining data peculiar to a human body; and
said authenticating means authenticates the user of said terminal apparatus by use of data including the data peculiar to the human body.

12. An authentication undertaking apparatus according to claim 10, wherein the data fixedly assigned to said terminal apparatus is a phone number of said terminal apparatus.

13. An authentication undertaking apparatus communicating in a communication network with a plurality of terminal apparatuses, each terminal apparatus being connectable to said communication via communication means and connectable to a plurality of websites via said communication network, the authentication undertaking apparatus comprising:
an authentication database for storing, for each user of said terminal apparatuses, a plurality of individual authentication data sets for input into said plurality of websites;
authenticating means for authenticating the user of each terminal apparatus through utilization of at least either data fixedly assigned to said terminal apparatus or data peculiar to the user;
specifying means for specifying a website which the user authenticated by said authenticating means wishes to utilize;
generating means for generating individual login data based on individual authentication data in the authentication database corresponding to the user and the specified website:
transmitting means for transmitting the individual login data directly to the terminal apparatus at which the user is resident via an HTML webpage; and
managing means for managing a valid term during which the authentication performed by said authenticating means is valid,
wherein the individual login data generated by the generating means comprises HTML data to be submitted by the terminal apparatus at which the user is resident for access to the specified website.

14. An authentication undertaking apparatus according to claim 13, wherein said terminal apparatus includes obtaining means for obtaining data peculiar to a human body; and
said authenticating means authenticates the user of said terminal apparatus by use of data including the data peculiar to the human body.

15. An authentication undertaking apparatus according to claim 13, wherein the data fixedly assigned to said terminal apparatus is a phone number of said terminal apparatus.

16. An authentication undertaking apparatus communicating in a communication network with a plurality of terminal apparatuses, each terminal apparatus being connectable to said communication network via communication means, connectable to a plurality of websites via said communication network, and having obtaining means for obtaining data including data peculiar to a human body and first authenticating means for performing a first-half stage of authentication processing for the obtained data peculiar to the human body, the authentication undertaking apparatus comprising:
second authenticating means for authenticating the user of each terminal apparatus while utilizing the data processed by said first authenticating means;
an authentication database for storing, for the user, a plurality of individual authentication data sets corresponding to said plurality of websites;
specifying means for specifying a website which the user authenticated by said second authenticating means wishes to utilize;
generating means for generating individual login data based on individual authentication data in the authentication database corresponding to the user and the specified website; and
transmitting means for transmitting the individual login data directly to the terminal apparatus at which the user is resident via an HTML webpage,
wherein the individual login data generated by the generating means comprises HTML data to be submitted by the terminal apparatus at which the user is resident for access to the specified website.

17. An authentication processing system comprising:
a communication network;
a plurality of terminal apparatuses, each being connectable to said communication network via communication means and connectable to a plurality of sites via said communication network; and
an authentication undertaking apparatus connected to said communication network and comprising:
a first database for storing, for each user of said terminal apparatuses, a plurality of individual authentication data sets to be putted into said plurality of sites;
first means for authenticating the user of each terminal apparatus through utilization of at least either data fixedly assigned to said terminal apparatus or data peculiar to the user;
second means for specifying a site which the user authenticated by said first means wishes to utilize;
third means for extracting, with reference to said first database, individual authentication data corresponding to the user authenticated by said first means and the site specified by said second means and for providing the extracted individual authentication data to the specified site as first data; and
tenth means for enabling said plurality of sites to update said first database.

18. An authentication undertaking apparatus connectable to a plurality of terminal apparatuses via a communication network and also connectable to a plurality of websites via the communication network, said authentication undertaking apparatus comprising:
an authentication database for storing, for each user of said terminal apparatuses, a plurality of individual authentication data sets for input into said websites;
a website database for storing website data, including a type and an attribute of corresponding one of said individual authentication data sets, for each of said websites;
authenticating means for authenticating the user of each terminal apparatus through utilization of at least either data fixedly assigned to said terminal apparatus or data peculiar to the user;
specifying means for specifying a website which the user authenticated by said authenticating means wishes to utilize; and
generating means for generating individual login data based on individual authentication data in the authentication database corresponding to the user and the specified website;
transmitting means for transmitting the individual authentication data directly to the terminal apparatus at which the user is resident via an HTML webpage, wherein the individual login data generated by the generating means comprises HTML data to be submitted by the terminal apparatus at which the user is resident for access to the specified website.

19. An authentication undertaking apparatus connectable to a plurality of terminal apparatuses via a communication network and also connectable to a plurality of websites via the communication network, said authentication undertaking apparatus comprising:
   an authentication database for storing, for each user of said terminal apparatuses, a plurality of individual authentication data sets for input into the websites;
   a website database for storing website data, including a type and an attribute of the corresponding individual authentication data set for each of the websites;
   authenticating means for authenticating the user of each terminal apparatus through utilization of data peculiar to the body of the user;
   specifying means for specifying a website which the user authenticated by said authenticating means wishes to utilize;
   generating means for generating individual login data based on individual authentication data in the authentication database corresponding to the user and the specified website; and
   transmitting means for transmitting the individual login data directly to the terminal apparatus at which the user is resident via an HTML webpage,
   wherein the individual login data generated by the generating means comprises HTML data to be submitted by the terminal apparatus at which the user is resident for access to the specified website.

20. A terminal apparatus comprising:
   communication means connectable to a communication network;
   connection means connectable to a website external to the terminal apparatus and an authentication undertaking apparatus via said communication network;
   means for obtaining data peculiar to a human body; and
   means for performing a first-half stage of authentication processing for the obtained data peculiar to the human body;
   means for transmitting second-half stage of authentication processing to an authentication undertaking apparatus external to the terminal, the means for transmitting being performed if the means for performing the first-half stage of authentication processing authenticates a user;
   means for transmitting data for a specific website which a user of the terminal apparatus wishes to utilize;
   means for receiving individual login data, via an HTML webpage, directly from the authentication undertaking apparatus if authentication is found, the individual login data for logging into the specific website; and
   means for sending the individual login data received by the terminal apparatus to the website in order to login to the specific website,
   wherein the individual login data comprises HTML data sent by the terminal apparatus at which the user is resident for access to the specific website.

21. An authentication undertaking apparatus according to claim 1, further comprising a website database comprising information regarding the selected website;
   wherein the generating means comprises:
      means for accessing the website database; and
      means for generating the individual login data based on the website database, the authentication database, the user and the selected website in order for the terminal apparatus to access the specified website.

22. An authentication undertaking apparatus according to claim 7, further comprising a website database comprising information regarding the selected website;
   wherein the generating means comprises:
      means for accessing the website database; and
      means for generating the individual login data based on the website database, the authentication database, the user and the selected website in order for the terminal apparatus to access the specified website.

23. An authentication undertaking apparatus according to claim 10, further comprising a website database comprising information regarding the selected website;
   wherein the generating means comprises:
      means for accessing the website database; and
      means for generating the individual login data based on the website database, the authentication database, the user and the selected website in order for the terminal apparatus to access the specified website.

24. An authentication undertaking apparatus according to claim 13, further comprising a website database comprising information regarding the selected website;
   wherein the generating means comprises:
      means for accessing the website database; and
      means for generating the individual login data based on the website database, the authentication database, the user and the selected website in order for the terminal apparatus to access the specified website.

25. An authentication undertaking apparatus according to claim 1, wherein the authentication database stores the individual authentication data correlated to the specified website; and
   wherein the generating means generates the individual login data by accessing the individual authentication data in the authentication database using the specified website and by accessing website data, the website data correlated to the specified website.

26. An authentication undertaking apparatus according to claim 25, wherein the website data comprises data in order to submit the individual authentication data to the specified website.

27. An authentication undertaking apparatus according to claim 25, wherein the individual login data, when transmitted from the terminal apparatus to the specified website, provides the individual authentication data to the specified website for an automatic login procedure.

28. An authentication undertaking apparatus according to claim 18, wherein the authentication database stores the individual authentication data correlated to the specified website; and
   wherein the generating means generates the individual login data by accessing the individual authentication data in the authentication database using the specified website and by accessing website data, the website data correlated to the specified website.

29. An authentication undertaking apparatus according to claim 28, wherein the website data comprises data in order to submit the individual authentication data to the specified website.

30. An authentication undertaking apparatus according to claim 28, wherein the individual login data, when transmitted from the terminal apparatus to the specified website, provides the individual authentication data to the specified website for an automatic login procedure.

31. A terminal apparatus according to claim 20, wherein the website data comprises data in order to submit the individual authentication data to the specified website.

32. An authentication undertaking apparatus according to claim 31, wherein the individual login data, when sent from the terminal apparatus to the specified website, provides the individual authentication data to the specified website for an automatic login procedure.

* * * * *